United States Patent [19]

Odaka et al.

[11] 4,413,340
[45] Nov. 1, 1983

[54] ERROR CORRECTABLE DATA TRANSMISSION METHOD

[75] Inventors: Kentaro Odaka; Yoichiro Sako; Ikuo Iwamoto; Toshitada Doi, all of Kanagawa, Japan; Lodewijk B. Vries, Eindhoven, Netherlands

[73] Assignee: Sony Corporation, Tokyo, Japan

[21] Appl. No.: 320,492

[22] Filed: Nov. 12, 1981

Related U.S. Application Data

[63] Continuation-in-part of Ser. No. 265,465, May 20, 1981, abandoned.

[30] Foreign Application Priority Data

May 21, 1980 [JP] Japan .................................. 55-67608

[51] Int. Cl.$^3$ .............................................. G06F 11/10
[52] U.S. Cl. .......................................... 371/39; 371/38
[58] Field of Search .............................. 371/38, 39, 40

[56] References Cited

U.S. PATENT DOCUMENTS

| | | | |
|---|---|---|---|
| 3,988,677 | 10/1976 | Fletcher et al. | 371/40 |
| 4,206,440 | 6/1980 | Doi et al. | 371/39 |
| 4,238,852 | 12/1980 | Iga et al. | 371/40 |
| 4,306,305 | 12/1981 | Doi et al. | 371/38 |
| 4,330,860 | 5/1982 | Wada et al. | 371/39 |
| 4,336,612 | 6/1982 | Inoue et al. | 371/39 |
| 4,355,392 | 10/1982 | Doi et al. | 371/45 |
| 4,356,564 | 10/1982 | Doi et al. | 371/40 |

Primary Examiner—Charles E. Atkinson
Attorney, Agent, or Firm—Lewis H. Eslinger; Alvin Sinderbrand

[57] ABSTRACT

An error correcting encoding and decoding system for transmission and reception of digital data is arranged for high error-correcting ability of both burst errors and random errors. In encoding apparatus a digital signal is processed as a plurality of word sequences. The words are interleaved into a different arranging order and are subjected to different relative amounts of delay. Then, first check words are generated to satisfy a parity detection matrix, such as a Reed-Solomon code matrix. After this, the resulting data words and first check words are again interleaved and are provided with respective different amounts of delay. Then, second check words are generated to satisfy a similar matrix. Finally, the first and second check words and the data words are interleaved prior to transmission. In complementary decoding apparatus, the cross-interleaved received signal is de-interleaved in a fashion complementary to the interleaving performed during transmission and the data words are delayed a complementary amount. The received data words are decoded by providing syndromes generated according to the parity detection matrix and burst or random errors are corrected by the check words.

39 Claims, 15 Drawing Figures

FIG. 2

| 16 BITS | | | | | | | | | | | | | | | |
|---|---|---|---|---|---|---|---|---|---|---|---|---|---|---|---|
| SYNC | U1 | U2 | U3 | U4 | U5 | U6 | U7 | U8 | ---- | U27 | U28 | U29 | U30 | U31 | U32 |

← TRANSMITTING BLOCK (8×32+16 = 272 BITS) →

FIG. 5

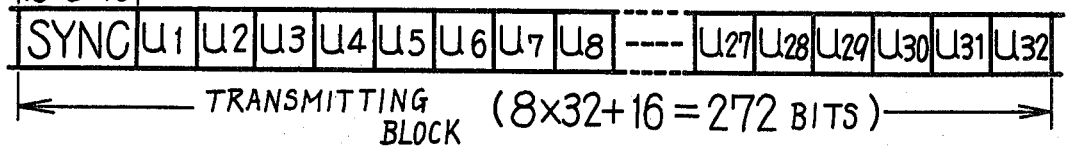

$$H_{C2} \cdot V^T = \begin{bmatrix} S21 \\ S22 \\ S23 \\ S24 \end{bmatrix}$$

$$= \begin{bmatrix} 1 & 1 & 1 & 1 & 1 & \cdots & 1 & 1 & 1 & 1 & 1 \\ \alpha^{28} & \alpha^{27} & \alpha^{26} & \alpha^{25} & \alpha^{24} & \cdots & \alpha^{5} & \alpha^{4} & \alpha^{3} & \alpha^{2} & \alpha^{1} \\ \alpha^{56} & \alpha^{54} & \alpha^{52} & \alpha^{50} & \alpha^{48} & \cdots & \alpha^{10} & \alpha^{8} & \alpha^{6} & \alpha^{4} & \alpha^{2} \\ \alpha^{84} & \alpha^{81} & \alpha^{78} & \alpha^{75} & \alpha^{72} & \cdots & \alpha^{15} & \alpha^{12} & \alpha^{9} & \alpha^{6} & \alpha^{3} \end{bmatrix} \begin{bmatrix} W_{12n-12}, A \\ W_{12n-12}, B \\ W_{12n+1-12}, A \\ W_{12n+1-12}, B \\ W_{12n+4-12}, A \\ W_{12n+4-12}, B \\ W_{12n+5-12}, A \\ W_{12n+5-12}, B \\ W_{12n+8-12}, A \\ W_{12n+8-12}, B \\ W_{12n+9-12}, A \\ W_{12n+9-12}, B \\ W_{12n+2}, A \\ W_{12n+2}, B \\ W_{12n+3}, A \\ W_{12n+3}, B \\ W_{12n+6}, A \\ W_{12n+6}, B \\ W_{12n+7}, A \\ W_{12n+7}, B \\ W_{12n+10}, A \\ W_{12n+10}, B \\ W_{12n+11}, A \\ W_{12n+11}, B \\ Q_{12n} \\ Q_{12n+1} \\ Q_{12n+2} \\ Q_{12n+3} \end{bmatrix}$$

FIG. 4

$$H_{C1} \cdot V^T = \begin{bmatrix} S_{11} \\ S_{12} \\ S_{13} \\ S_{14} \end{bmatrix}$$

$$= \begin{bmatrix} \alpha^{32} & \alpha^{31} & \alpha^{30} & \alpha^{29} & \alpha^{28} & --- & \alpha^5 & \alpha^4 & \alpha^3 & \alpha^2 & \alpha^1 \\ \alpha^{64} & \alpha^{62} & \alpha^{60} & \alpha^{58} & \alpha^{56} & --- & \alpha^{10} & \alpha^8 & \alpha^6 & \alpha^4 & \alpha^2 \\ \alpha^{96} & \alpha^{93} & \alpha^{90} & \alpha^{87} & \alpha^{84} & --- & \alpha^{15} & \alpha^{12} & \alpha^9 & \alpha^6 & \alpha^3 \end{bmatrix} \begin{bmatrix} W_{12n-12}, A \\ W_{12n-12(1D+1)}, B \\ W_{12n+1-12(2D+1)}, A \\ W_{12n+1-12(3D+1)}, B \\ W_{12n+4-12(4D+1)}, A \\ W_{12n+4-12(5D+1)}, B \\ W_{12n+5-12(6D+1)}, A \\ W_{12n+5-12(7D+1)}, B \\ W_{12n+8-12(8D+1)}, A \\ W_{12n+8-12(9D+1)}, B \\ W_{12n+9-12(10D+1)}, A \\ W_{12n+9-12(11D+1)}, B \\ Q_{12n-12(12D)} \\ Q_{12n+1-12(13D)} \\ Q_{12n+2-12(14D)} \\ Q_{12n+3-12(15D)} \\ W_{12n+2-12(16D)}, A \\ W_{12n+2-12(17D)}, B \\ W_{12n+3-12(18D)}, A \\ W_{12n+3-12(19D)}, B \\ W_{12n+6-12(20D)}, A \\ W_{12n+6-12(21D)}, B \\ W_{12n+7-12(22D)}, A \\ W_{12n+7-12(23D)}, B \\ W_{12n+10-12(24D)}, A \\ W_{12n+10-12(25D)}, B \\ W_{12n+11-12(26D)}, A \\ W_{12n+11-12(27D)}, B \\ P_{12n} \\ P_{12n+1} \\ P_{12n+2} \\ P_{12n+3} \end{bmatrix}$$

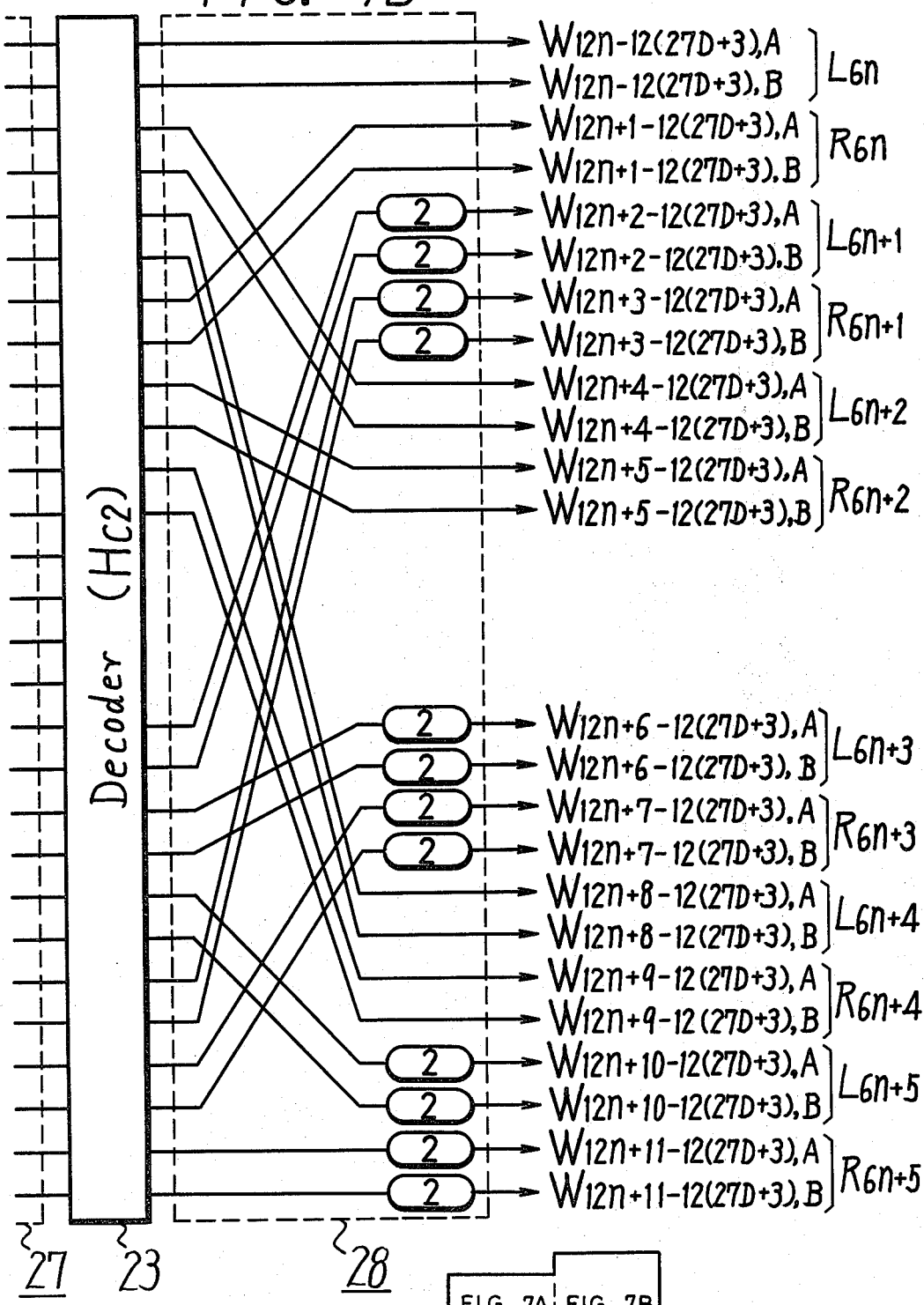

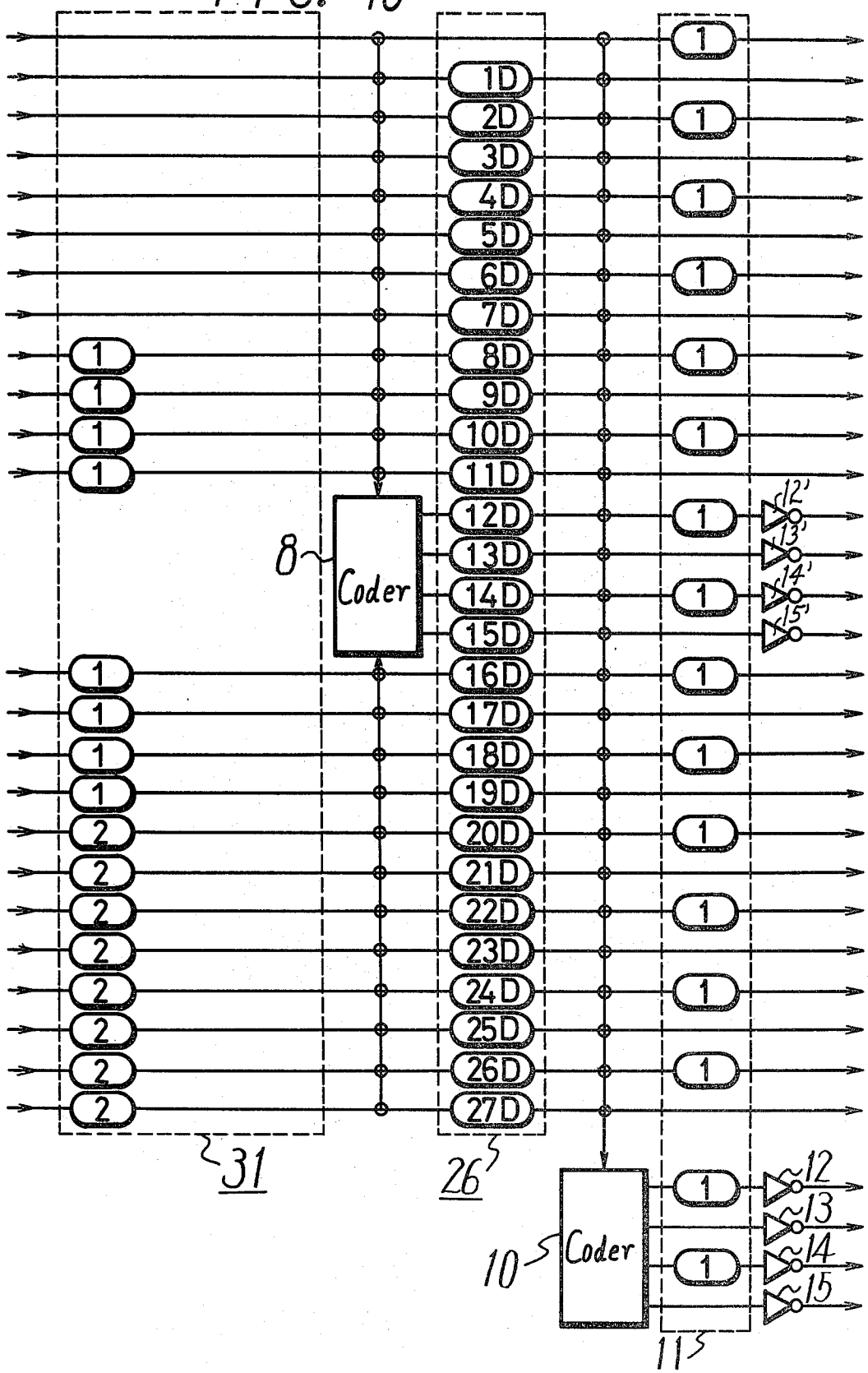

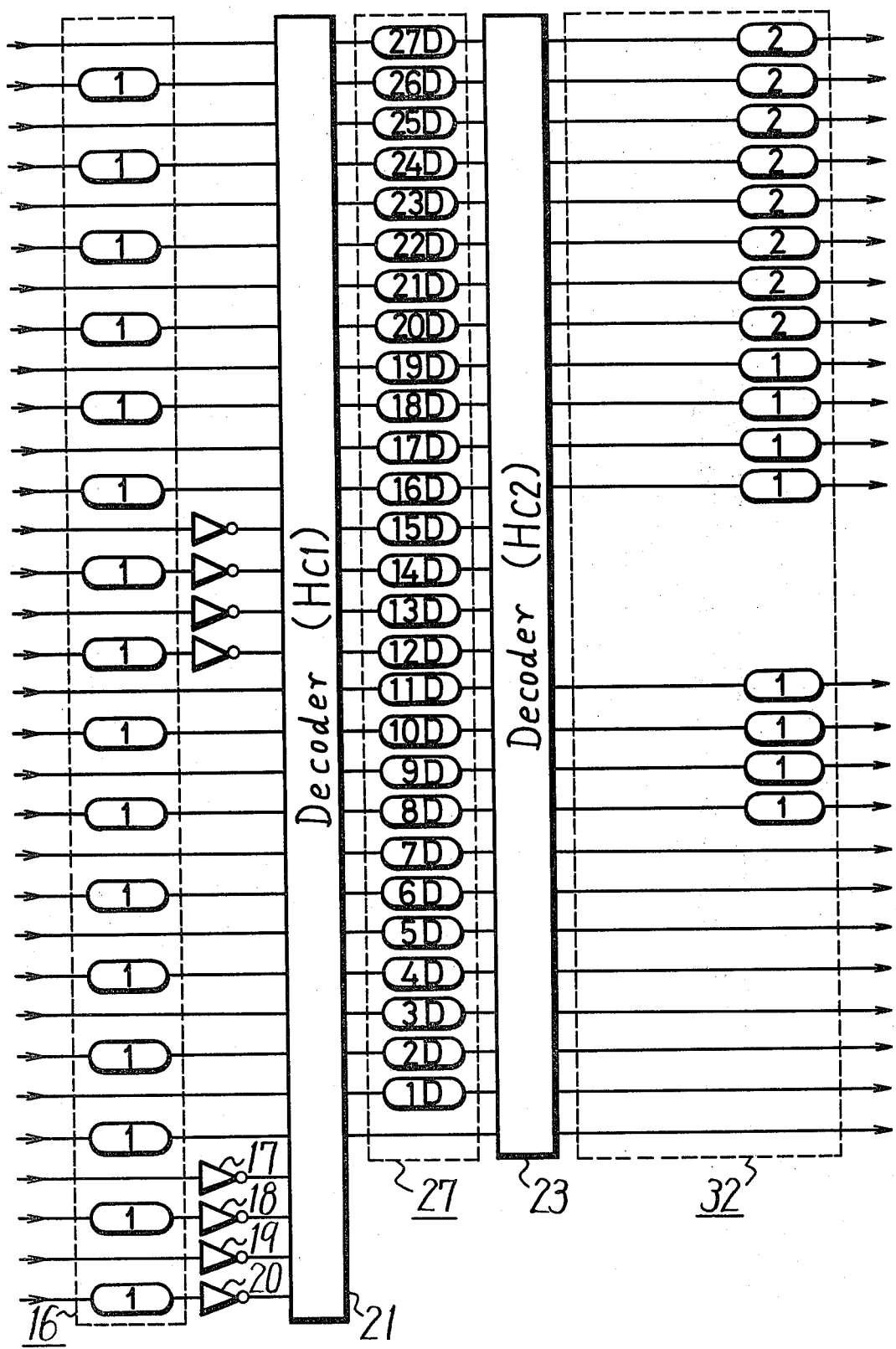

ERROR CORRECTABLE DATA TRANSMISSION METHOD

RELATED APPLICATION DATA

This is a continuation-in-part of our copending application Ser. No. 265,465, filed May 20, 1981, now abandoned.

BACKGROUND OF THE INVENTION

1. Field of the Invention

The present invention relates to an error correctable data transmission system, and in particular is directed to a system for transmitting digital information signals through a transmission medium such as magnetic tape or an optical digital audio disc, where the transmitted signal is subjected to disturbances causing both burst errors and random errors, and for enabling correction, with high error-correcting ability, of the errors which occur in the received digital signal.

2. Description of the Prior Art

There has been previously proposed, for example, in copending application Ser. No. 218,256, filed Dec. 19, 1980 and having a common assignee herewith, a data transmission system effective for correcting burst errors using a so-called cross-interleave technique. In such cross-interleave technique, words in a PCM (pulse code modulated) data signal are provided in plural sequences on plural respective channels arranged in a first arrangement state, and are furnished to a first error-correcting coder to generate therefrom a first check word series. This first check word series and the PCM data signal series in the plural channels are converted to a second arrangement state. Then, one word in the second arrangement state for each of the PCM data signal sequences in the plural channels is furnished to a second error correcting coder to generate therefrom a second check word series, so that a double interleave (i.e., double re-arrangement) is carried out for each word. The purpose of the double interleave is to reduce the number of erroneous words in any group of words contained in a single error-correcting block when the check word contained in such error-correcting block and the PCM data associated therewith are transmitted. Any such erroneous words are dispersed among several blocks, and are returned to the original arrangement thereof at the receiving side. In other words, when a burst error develops during transmission, the burst error can be dispersed. If the above interleave is performed twice, the first and second check words each are used to correct errors in distinct error correcting blocks. Thus, even if an error cannot be corrected by one of the first and second check words, the error can be corrected by the other check word. Therefore, this technique provides a significant advance in error correcting ability for burst errors.

However, when even one bit in one word is discovered to be in error, the entire word is considered erroneous. Therefore, when a received data signal has a relatively large number of *random* errors, the above-described double interleave technique is not always sufficiently powerful for correcting these random errors.

OBJECTS AND SUMMARY OF THE INVENTION

Accordingly, it is an object of this invention to provide an improved error-correctable data transmission system in which both *burst* errors and *random* errors that occur during transmission of the signal can be corrected at the receiving side.

Another object of the invention is to provide a novel system for transmitting digital signals together with parity signals which are generated from such digital signals, and for correcting both burst errors and random errors in the transmitted signal by utilizing the parity signals.

A further object of the invention is to provide an error correctable data transmission system which is high in error correcting ability, which can correct up to two word errors in any one block, and which also can correct up to four word errors when the position of an error is known.

Still another object of this invention is to provide an error correctable data transmission system in which a decoder used therefor can be simplified in construction, thereby enabling the receiving apparatus to be constructed simply and economically.

An additional object of this invention is to provide an error correctable data transmission system in which a decoder used therefor can be constructed rather simply when the error detecting code is used to correct only a single word error.

A still further object of this invention is to provide a carrier, such as a tape or an optical disc, carrying the digital signals encoded according to this invention.

According to an aspect of this invention, a digital signal transmission system for transmitting and subsequently receiving a digital information signal formed of a plurality of series of information words, each word being of a predetermined bit length, with each such series of words occurring in a respective input channel, and with check words included in the transmitted signal to enable correction of errors occurring in the signal as a result of transmission, is performed by applying a first block of words, taken one from each such input channel and having a first arrangement state, to a first error correcting encoder to generate a series of k first check words. Then, each of the words in the aggregate of words formed by the first block of words and the k first check words are delayed by respective different amounts of delay to provide a resulting second block of words having a second arrangement state. Following this, the second block of words is applied to a second error correcting encoder to generate a series of k second check words. Then, a third block formed from the second block and the second check words is placed on a transmission carrier, which can be, for example, a radio frequency channel, a coaxial cable, a magnetic tape, or an optical disc.

For reproducing the digital signal from the received encoded signal and correcting any errors that may occur therein as a result of the transmission process, blocks of digital data words and the first and second check signals are applied to a first decoder, the received digital data words are decoded therein, and the digital data words and the series of first check words are corrected by use of the second check words. Then the digital data words and the second check words are provided with respective different amounts of delay so as to compensate for the corresponding amounts of delay imparted prior to transmission. After this, the digital data words are decoded, and the latter are corrected by use of the first check words, and are provided as a decoded output digital signal.

The check words are preferably generated to satisfy a Reed-Solomon code parity detection matrix H having the form $$H = \begin{bmatrix} 1 & 1 & 1 & \ldots 1 & 1 \\ \alpha^1 & \alpha^2 & \alpha^3 & \ldots \alpha^{n-1} & \alpha^n \\ \alpha^2 & \alpha^4 & \alpha^6 & \ldots \alpha^{2(n-1)} & \alpha^{2n} \\ \vdots & \vdots & \vdots & \vdots & \vdots \\ \alpha^{k-1} & \alpha^{(k-1)2} & \alpha^{(k-1)3} & \ldots \alpha^{(k-1)(n-1)} & \alpha^{(k-1)n} \end{bmatrix}$$

or $$H = \begin{bmatrix} 1 & 1 & 1 & \ldots 1 & 1 \\ 1 & \alpha^1 & \alpha^2 & \ldots \alpha^{n-2} & \alpha^{n-1} \\ 1 & \alpha^2 & \alpha^4 & \ldots \alpha^{2(n-2)} & \alpha^{2(n-1)} \\ \vdots & \vdots & \vdots & \vdots & \vdots \\ 1 & \alpha^{(k-1)} & \alpha^{(k-1)2} & \ldots \alpha^{(k-1)(n-2)} & \alpha^{(k-1)(n-1)} \end{bmatrix}$$

where $\alpha$ is a root of a polynomial $F(X)$ which is irreducible over a galois field GF(2), m is the bit length of each of the words of the digital signal, and n is the number of words in each block formed of the digital words of the information signal together with the associated check words. The decoding and correcting of the received signal is also performed according to such detection matrix H.

It will be understood that a detection or parity check matrix H which can be used with this invention will, in general terms, be formed of n columns and k rows, in which each element of one predetermined row is selected from digital values from zero to $2^m - 1$, so that the same value does not appear twice in that row. The elements in the remaining rows are then selected as a given power (e.g., $\alpha^0 = 1$, $\alpha^2$, $\alpha^7$), for all the elements in each respective row, of the corresponding elements in the predetermined row.

Although the encoding algorithm for encoding the digital signal to obtain the check code involves the solution of complicated simultaneous equations, the decoding algorithm for the Reed-Solomon code is rather simple. As a result, apparatus for receiving and decoding the transmitted signal, e.g., a tape player or optical disc player for a digital audio system, can be supplied at low cost yet with remarkable power in its ability to correct random and burst errors.

Other objects, features, and advantages of this invention will be apparent from the following description, taken in conjunction with the accompanying drawings.

BRIEF DESCRIPTION OF THE DRAWINGS

FIG. 2 shows an arrangement of a block of encoded data at transmission.

FIGS. 4 and 5 are diagrams used to explain the generation of syndromes during operation of the error correcting decoder.

FIGS. 10 and 11 show portions of still another alternative embodiment of an error correcting encoder and decoder, respectively.

DESCRIPTION OF THE PREFERRED EMBODIMENTS

Figure 1A:
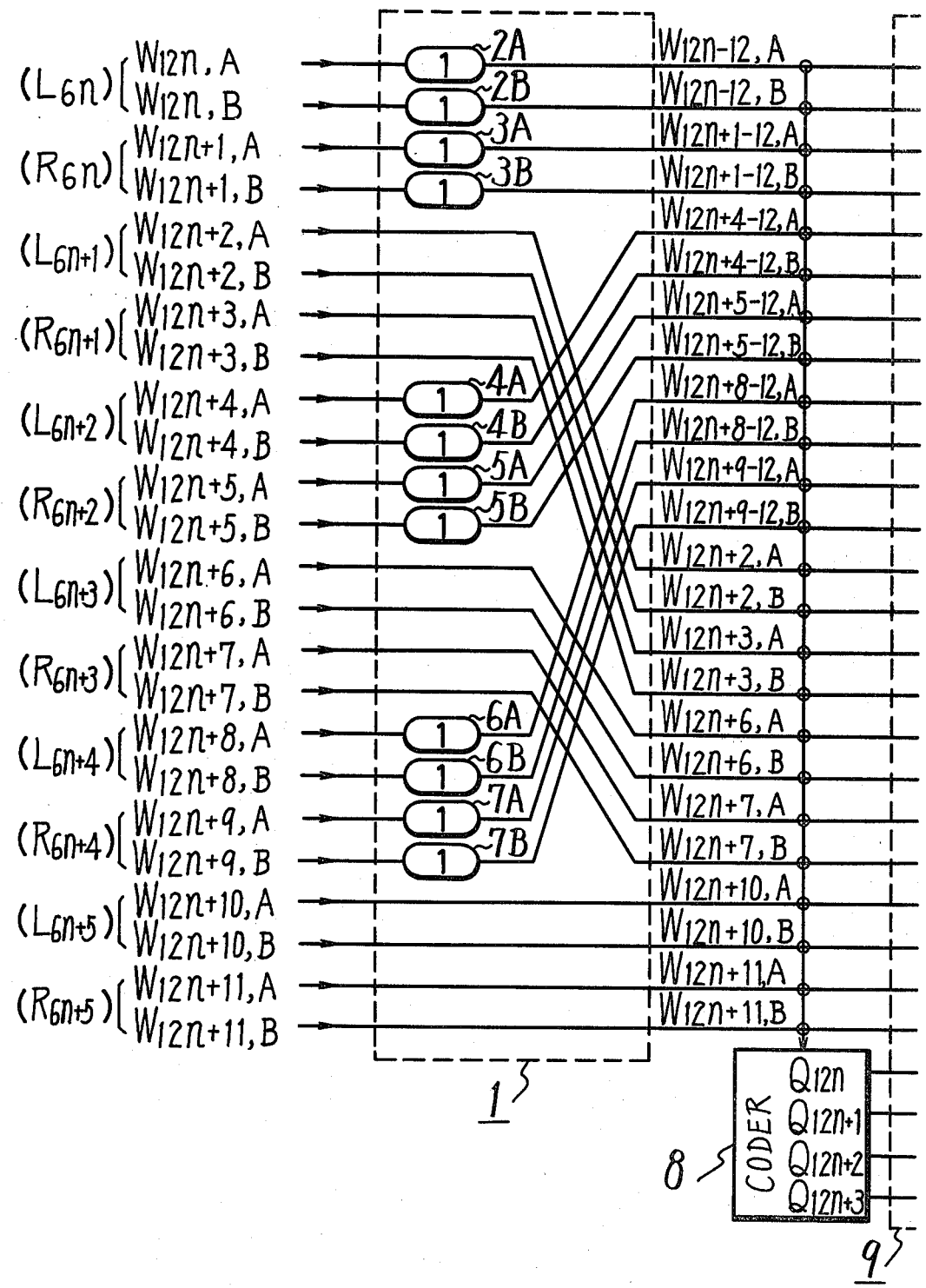
FIG. 1 (formed of FIGS. 1A and 1B) is a block diagram showing an example of an error correcting encoder embodying the present invention.

First, an error correcting code used in this invention will be explained. In this discussion, the error correcting code is expressed by a vector representation or a cyclic group representation.

To begin, an irreducible mth order polynominal F(x) will be considered on a galois field GF(2). On the field GF(2) which contains only the elements "0" and "1", the irreducible polynominal F(x) has no real root. Thus, an imaginary (or complex) root $\alpha$, which will satisfy $F(x) = 0$, will be considered. At this time $2^m$ different elements 0, $\alpha$, $\alpha^2$, $\alpha^3$, $\alpha^{2m-}$... $\alpha^{2m-1}$, each being a power of $\alpha$ and containing a zero element, form an extension galois field $GF(2^m)$. This extension field $GF(2^m)$ is a polynominal ring with an mth order irreducible polynominal F(x), over the field $GF(2^m)$ can be expressed as a linear combination of 1, $\alpha = [x]$, $\alpha^2 = [x^2]$; ... $a^{m-1} = [x^{m-1}]$. That is, these elements can be expressed $$a_0 + a_1[x] + a_2[x^2] + \ldots + a_{m-1}[x^{m-1}] = a_0 + a_1\alpha + a_2\alpha^2 + \ldots a_{m-1}\alpha^{m-1}$$

or $$(a_{m-1}, a_{m-2}, \ldots a_2, a_1, a_0)$$

where $a_0, a_1, \ldots a_{m-1}$ are elements of $GF(2^m)$

As an example, consider the extension field $GF(2^8)$ and, as a modulo, the polynomial $F(x) = x^8 + x^4 + x^3 + x^2 + 1$, (all variables being eight-bit data). This field $GF(2^8)$ can be expressed as follows:

$$a_7x^7 + a_6x^6 + a_5x^5 + a_4x^4 + a_3x^3 + a_2x^2 + a_1x + a_0$$

or $$(a_7, a_6, a_5, a_4, a_3, a_2, a_1, a_0)$$

Therefore, by way of example, $a_7$ is considered the MSB (most significant bit) and $a_0$ is considered the LSB (least significant bit). Since $a_n$ belongs to GF(2), its elements are either 0 or 1.

Further, from the polynominal F(x) there is derived the following matrix T of m rows by m columns.

$$T = \begin{bmatrix} 0 & 0 & \ldots & 0 & a_0 \\ 1 & 0 & \ldots & 0 & a_1 \\ 0 & 1 & \ldots & 0 & a_2 \\ \vdots & \vdots & & \vdots & \vdots \\ 0 & 0 & & 1 & a_{m-1} \end{bmatrix}$$

As an alternative expression, there can be used an expression which includes a cyclic group which recognizes that the remainder of the extension galois field $GF(2^m)$ (except the zero element) forms a multiplicative group with the order $2^m-1$. If the elements of GF($2^m$) are expressed by using a cyclic group, the following are obtained:

$$0, 1(=\alpha^{2m-1}), \alpha, \alpha^2, \alpha^3, \alpha^{2m-2} \quad (5)$$

In the present invention, when m bits form one word and n words form one block, k check words are generated based upon a parity check matrix H, such as the following:

$$H = \begin{bmatrix} 1 & 1 & 1 & \ldots & 1 & 1 \\ \alpha^1 & \alpha^2 & \alpha^3 & \ldots & \alpha^{n-1} & \alpha^n \\ \alpha^2 & \alpha^4 & \alpha^6 & \ldots & \alpha^{2(n-1)} & \alpha^{2n} \\ \cdot & \cdot & \cdot & & \cdot & \cdot \\ \alpha^{k-1} & \alpha^{(k-1)2} & \alpha^{(k-1)3} & \ldots & \alpha^{(k-1)(n-1)} & \alpha^{(k-1)n} \end{bmatrix}$$

Further, the parity check matrix H can be similarly expressed by using the matrix T as follows:

$$H = \begin{bmatrix} I & I & I & \ldots & I & I \\ T^1 & T^2 & T^3 & \ldots & T^{n-1} & T^n \\ T^2 & T^4 & T^6 & \ldots & T^{2(n-1)} & T^{2n} \\ \cdot & \cdot & \cdot & & \cdot & \cdot \\ T^{k-1} & T^{(k-1)2} & T^{(k-1)3} & \ldots & T^{(k-1)(n-1)} & T^{(k-1)n} \end{bmatrix}$$

where I is a unit matrix of m rows and m columns.

As mentioned above, the expressions using the root $\alpha$ are fundamentally the same as those using a generating matrix.

In this case, an equivalent formulation of the matrix H can be obtained by selecting all of the first column of each matrix as 1 or I and omitting the last column of each matrix.

The error correcting code will be described in detail with an example in which k=4, that is, four check words are used. In this case, if a single block of received data is expressed as a column vector $V=(W_1, W_2, W_3, \ldots W_n)$, four syndromes $S_1, S_2, S_3,$ and $S_4$, generated in the receiving side, are expressed as follows:

$$\begin{bmatrix} S_1 \\ S_2 \\ S_3 \\ S_4 \end{bmatrix} = H \cdot V^T$$

$$S_1 = \sum_{i=1}^{n} W_i,$$

$$S_2 = \sum_{i=1}^{n} T^i W_i,$$

$$S_3 = \sum_{i=1}^{n} T^{2i} W_i, \text{ and}$$

$$S_4 = \sum_{i=1}^{n} T^{3i} W_i$$

In each block there are contained four check words ($p=W_{n-3}$, $q=W_{n-2}$, $r=W_{n-1}$, $s=W_n$). These check words can be obtained from the following relationships:

$$p + q + r + s = \Sigma W_i$$

$$T^{n-3}p + T^{n-2}q + T^{n-1}r + T^n s = \Sigma T^i W_i$$

$$T^{2n-6}p + T^{2n-4}q + T^{2n-2}r + T^{2n}s = \Sigma T^{2i}W_i$$

$$T^{3n-9}p + T^{3n-6}q + T^{3n-3}r + T^{3n}s = \Sigma T^{3i}W_i$$

$$p + q + r + s = \Sigma W_i \quad = a$$

$$p + Tq + T^2 r + T^3 s = \Sigma T^{i-n+3} W_i \quad = b$$

$$p + T^2 q + T^4 r + T^6 s = \Sigma T^{2(i-n+3)} W_i = c$$

$$p + T^3 q + T^6 r + T^9 s = \Sigma T^{3(i-n+3)} W_i = d$$

where $\Sigma$ is $\sum_{i=1}^{n-4}$.

The four check words can be obtained by solving the above simultaneous equations. The calculation for this purpose is defined in the extension galois field GF($2^m$), and only the calculation result is shown as follows:

$$p = \frac{T^6 a + (T^3 + T^4 + T^5)b + (T + T^2 + T^3)c + d}{(1+T)(1+T^2)(1+T^3)}$$

$$q = \frac{T^5 a + (T^2 + T^3 + T^5)b + (1 + T^2 + T^3)c + d}{T^2(1+T^4)}$$

$$r = \frac{T^4 a + (T + T^3 + T^4)b + (1 + T + T^3)c + d}{T^3(1+T^4)}$$

$$s = \frac{T^3 a + (T + T^2 + T^3)b + (1 + T + T^2)c + d}{T^3(1+T)(1+T^2)(1+T^3)} \text{ ; or}$$

$$p = [T^6 \Sigma W_i + (1 + T + T^2)\{\Sigma T^{i-n+6}W_i + T^{2(i-n+3)+1}W_i + T^{3(i-n+3)}W_i\}(1+T)^{-1}(1+T^2)^{-1}(1+T^3)^{-1}$$

$$q = [T^5 \Sigma W_i + (1 + T + T^3)\Sigma T^{i-n+5}W_i + (1 + T^2 + T^3)\Sigma T^{2(i-n+3)}W_i + \Sigma T^{3(i-n+3)}W_i]T^{-2}(1+T^4)^{-1}$$

$$r = [T^4 \Sigma W_i + (1 + T^2 + T^3)\Sigma T^{i-n+4}W_i + (1 + T + T^3)\Sigma T^{2(i-n+3)}W_i + \Sigma T^{3(i-n+3)}W_i]T^{-3}(1+T^4)^{-1}$$

$$s = [T^3 \Sigma W_i + (1 + T + T^2)\{\Sigma T^{i-n+4}W_i + \Sigma T^{2(i-n+3)}W_i + \Sigma T^{3(i-n+3)}W_i\}T^{-3}(1+T)^{-1}(1+T^2)^{-1}(1+T^3)^{-1}$$

Next, error correction will be described when data including the check words generated as above are transmitted and then received. In this case, it is assumed that the bit position of any error is unknown, that is, an error detecting code for pointing out an error position is not used.

[1] If there is no error, the syndromes are all zero:

$$S_1 = S_2 = S_3 = S_4 = 0$$

[2] If there is one word error (an error pattern being represented as ei), $$S_1 = e_i, \; S_2 = T^i e_i, \; S_3 = T^{2i} e_i, \text{ and } S_4 = T^{3i} e_i.$$

Thus, the following relations are established:

$$T^i S_1 = S_2$$

$T^i S_2 = S_3$ $T^i S_3 = S_4$

At this time, the syndrome $S_1$ becomes the error pattern ei itself.

[3] In the case of two word errors (ei and ej), the syndromes follow the relationships:

$S_1 = ei + ej$ $S_2 = T^i ei + T^j ej$ $S_3 = T^{2i} ei + T^{2j} ej$ $S_4 = T^{3i} ei + T^{3j} ej$

The above equations can be modified as follows:

$T^j S_1 + S_2 = (T^i + T^j) ei$ $T^j S_2 + S_3 = T^i (T^i + T^j) ei$ $T^j S_3 + S_4 = T^{2i} (T^i + T^j) ei$

Accordingly, if the following equations are established, two word errors are discriminated.

$T^i (T^j S_1 + S_2) = T^j S_2 + S_3$ $T^i (T^j S_2 + S_3) = T^j S_3 + S_4$

The error patterns at this time are expressed as follows:

$$ei = \frac{S_1 + T^{-j} S_2}{1 + T^{i-j}} \text{ and } ej = \frac{S_1 + T^{-i} S_2}{1 + T^{j-i}}$$

[4] Where three word errors (ei, ej, and ek) occur, the syndromes can be expressed:

$S_1 = ei + ej + ek$ $S_2 = T^i ei + T^j ej + T^k ek$ $S_3 = T^{2i} ei + T^{2j} ej + T^{2k} ek$ $S_4 = T^{3i} ei + T^{3j} ej + T^{3k} ek$

The above equations can be modified as follows:

$T^k S_1 + S_2 = (T^i + T^k) ei + (T^j + T^k) ej$ $T^k S_2 + S_3 = T^i (T^i + T^k) ei + T^i (T^j + T^k) ej$ $T^k S_3 + S_4 = T^{2i} (T^i + T^k) ei + T^{2j} (T^j + T^k) ej$

Accordingly, if the following equation is established, which is a necessary condition for three word errors, then all three word errors can be discriminated. Here the conditions $S_1 \neq 0$, $S_2 \neq 0$ and $S_3 \neq 0$ are assumed to be satisfied:

$T^i \{ T^j (T^k S_1 + S_2) + (T^k S_2 + S_3) \} = T^j (T^k S_2 + S_3) + (T^k S_3 + S_4)$

The respective error patterns at this time are expressed as follows:

$$ei = \frac{S_1 + (T^{-j} + T^{-k}) S_2 + T^{-j-k} S_3}{(1 + T^{i-j})(1 + T^{i-k})}$$

$$ej = \frac{S_1 + (T^{-k} + T^{-i}) S_2 + T^{-k-i} S_3}{(1 + T^{j-i})(1 + T^{j-k})}, \text{ and}$$

$$ek = \frac{S_1 + (T^{-i} + T^{-j}) S_2 + T^{-i-j} S_3}{(1 + T^{k-i})(1 + T^{k-j})}$$

As described above, two word errors can be corrected without determining the error bit location.

If a pointer code is used and the error bit positions (that is, i, j, k, l) are identified thereby, up to four word errors can be corrected.

Further, if the number k of the clock words is increased, the error correcting ability can be improved accordingly.

Now, an embodiment of the present invention will be described with reference to the attached drawings. Therein the invention is applied, as an example, to the recording and reproducing of an audio PCM signal.

Figure 1B:
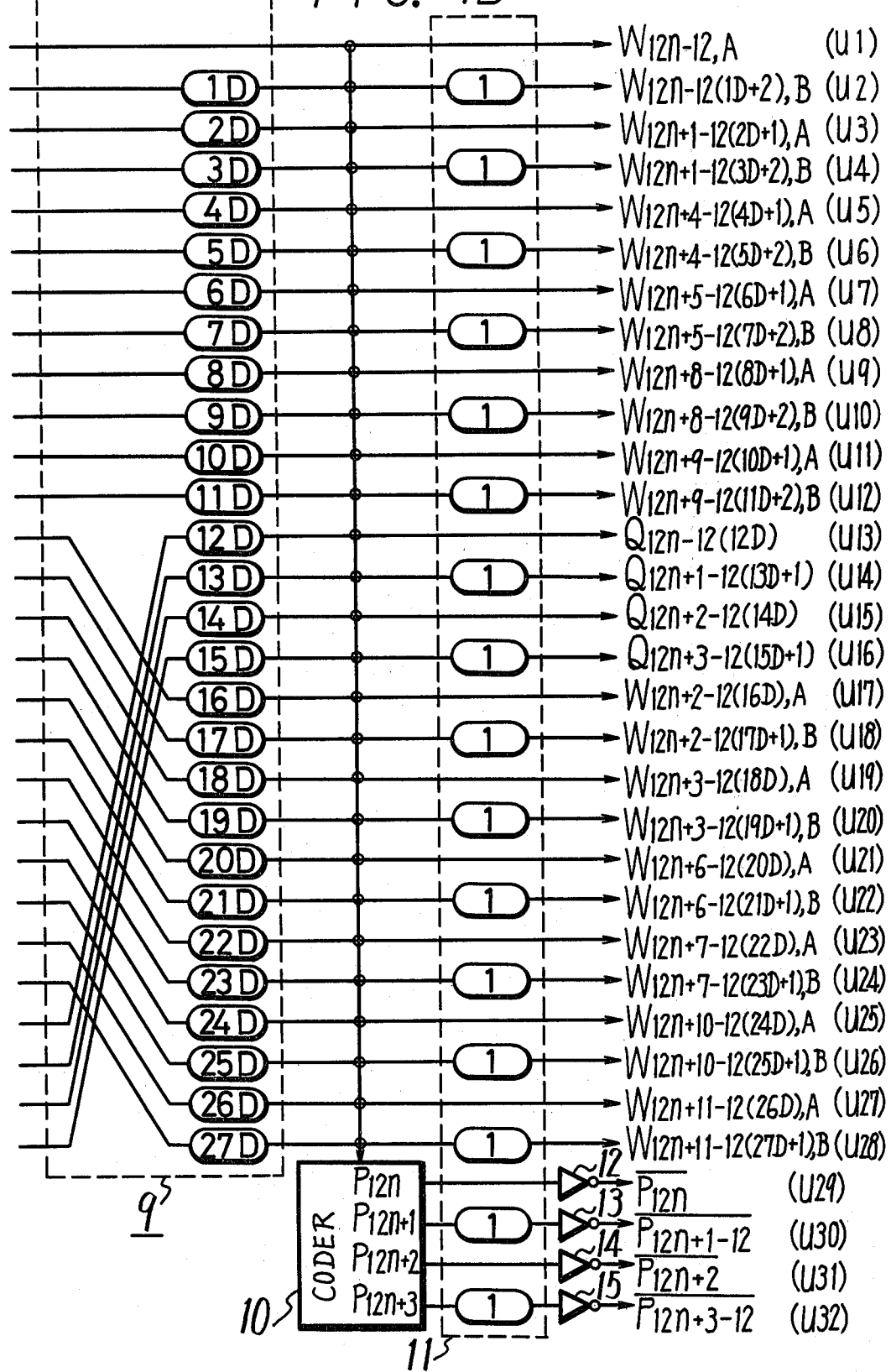

FIG. 1 shows, as a whole, an error correcting encoder provided in the recording system to which is supplied an audio PCM signal as an input signal. To provide this audio PCM signal, left and right stereo signals are respectively sampled at a sampling frequency $f_s$ (for example, 44.1 KHz) and each sampled value is converted into one digital word (which, for example, is encoded as a complement-of-two and has a length of sixteen bits). Accordingly, for the left channel of the audio signal there are obtained PCM data words $L_0, L_1, L_2 \ldots$ and for the right channel there are obtained PCM data words $R_0, R_1, R_2 \ldots$. The PCM data words of the left and right channels are each separated into six channels, and hence a total of twelve channels of PCM data sequences are input to the error correcting encoder. At any given point in time, twelve words, such as $L_{6n}, R_{6n}, L_{6n+1}, R_{6n+1}, L_{6n+2}, R_{6n+2}, L_{6n+3}, R_{6n+3}, L_{6n+4}, R_{6n+4}, L_{6n+5},$ and $R_{6n+5}$, are input into the encoder. In the illustrated example, each word is divided into an upper eight bits and lower eight bits, and hence the twelve channels are processed as twenty-four channels. For the sake of simplicity, each one word of the PCM data is expressed as Wi, its upper eight bits are expressed as Wi,A and its lower eight bits are expressed as Wi,B. For example, the word $L_{6n}$ is divided into two words, $W_{12n}$,A and $W_{12n}$,B.

The PCM data sequences of twenty-four channels are first applied to an even-and-odd interleaver 1. If n is an integer 0, 1, 2 . . . , the words $L_{6n}$ (i.e., $W_{12n}$,A and $W_{12n}$,B), $R_{6n}$ (i.e., $W_{12n+1}$,A and $W_{12n+1}$,B), $L_{6n+2}$ (i.e., $W_{12n+4}$,A and $W_{12n+4}$,B), $R_{6n+2}$ (i.e., $W_{12+5}$,A and $W_{12n+5}$,B) $L_{6n+4}$ (i.e., $W_{12n+9}$,A and $W_{12n+9}$,B) are respectively even-order words and the remaining words are respectively odd-order words. The PCM data sequences consisting of even-order words are respectively delayed through one word delay circuits or lines 2A, 2B, 3A, 3B, 4A, 4B, 5A, 5B, 6A, 6B, 7A, and 7B of the even-and-odd interleaver 1. Further, in the even-and-odd interleaver 1, the twelve data sequences consisting of even-order words are converted or shifted so as to occupy the first to twelfth transmission channels and twelve data sequences consisting of odd-order words are converted so as to occupy the thirteenth to twenty-fourth transmission channels, respectively.

The even-and-odd interleaver 1 serves to prevent more than two continuous words of the respective left and right stereo signals from developing errors, in which case the errors become substantially impossible to correct.

To explain the benefit of this feature, three continuous words $L_{i-1}$, $L_i$, and $L_{i+1}$ will be considered as an example. When the word $L_i$ is erroneous and it is not correctable, it is most desirable that both the surrounding words $L_{i-1}$ and $L_{i+1}$ be correct. The reason for this is that in order for an uncorrectable erroneous word $L_i$ is compensated, $L_i$ is interpolated between the preceding correct word $L_{i-1}$ and the following correct word $L_{i+1}$. The delay lines 2A, 2B, . . . 7A, and 7B of the even-and-odd interleaver 1 are provided so that adjacent words will occur in different error correcting blocks. Further, the reason for gathering together groups of channels for the even-order words and the odd-order words is that when the data sequences are interleaved, the distance between the recording positions of the adjacent even and odd order words should be as great as possible.

At the output of the even-and-odd interleaver 1, the words of the twenty-four channels appear in a first arrangement state. From the interleaver 1 respective PCM data words are applied word by word to an encoder 8 which then generates first check words $Q_{12n}$, $Q_{12n+1}$, $Q_{12n+2}$, and $Q_{12n+3}$, as shown by p, q, r, s in the expression given above.

An error correcting block including the first check words then occurs as follows:

($W_{12n-12}$,A; $W_{12n-12}$,B; $W_{12n+1-12}$,A; $W_{12n+1-12}$,B; $W_{12n+4-12}$,A; $W_{12n+4-12}$,B; $W_{12n+5-12}$,A; $W_{12n+5-12}$,B; $W_{12n+8-12}$,A; $W_{12n+8-12}$,B; $W_{12n+9-12}$,A; $W_{12n+9-12}$,B; $W_{12n+2}$,A; $W_{12n+2}$,B; $W_{12n+3}$,A; $W_{12n+3}$,B; $W_{12n+6}$,A; $W_{12n+6}$,B; $W_{12n+7}$,A; $W_{12n+7}$,B; $W_{12n+10}$,A; $W_{12n+10}$,B; $W_{12n+11}$,A; $W_{12n+11}$,B; $Q_{12n}$; $Q_{12n+1}$; $Q_{12n+2}$; $Q_{12n+3}$)

The first encoder 8 carries out its function by calculating the first check words $Q_{12n}$ to $Q_{12n+3}$ according to the number of words of one block (n=28); the bit length m of each word (m=8); and the number of the check words (k=4).

The twenty-four PCM data word sequences and the four check word series are then applied to an interleaver 9. In this interleaver 9, the relative positions of the channels are changed such that the check word series are located between the PCM data sequences consisting of the even order words and the PCM data sequences consisting of the odd order words, and thereafter a delay process is performed for these interleaving sequences. This delay process is carried out on twenty-seven transmission channels, beginning with the second transmission channel, by delay lines with delay amounts of 1D, 2D, 3D, 4D, . . . 26D, and 27D, respectively (where D is a unit delay amount).

At the output of the interleaver 8, twenty-eight sequences of data words appear in a second arrangement state. The data words are taken word by word from the respective data sequences and these words are fed to an encoder 10 which then produces second check words $P_{12n}$, $P_{12n+1}$, $P_{12n+2}$, $P_{12n+3}$ in the same manner as the check words $Q_{12n}$ to $Q_{12n+3}$.

Just as the above encoder 8 provides the above first check words according to the parameters n=28, m=8, and k=4, the similar encoder 10 provides the second check words according to the parameters n=32, m=8, and k=4.

An error correcting block including the second check words and consisting of thirty-two words is formed as follows:

($W_{12n-12}$,A; $W_{12n-12(D+1)}$,B; $W_{12n+1-12(2D+1)}$,A; $W_{12n+1-12(3D+1)}$,B; $W_{12n+4-12(4D+1)}$,A; $W_{12n+4-12(5D+1)}$,B; $W_{12n+5-12(6D+1)}$,A; $W_{12n+5-12(7D+1)}$,B; . . . ; $Q_{12n-12(12D)}$; $Q_{12n+1-12(13D)}$; $Q_{12n+2-12(14D)}$; $Q_{12n+3-12(15D)}$; · · · $W_{12n+10-12(24D)}$,A; $W_{12n+10-12(25D)}$,B; $W_{12n+11-12(26D)}$,A; $W_{12n+11-12(27D)}$,B; $P_{12n}$; $P_{12n+1}$; $P_{12n+2}$; $P_{12n+3}$).

An interleaver 11 is provided thereafter, and includes delay lines of one word delay amount for the even order transmission channels of the thirty-two data sequences including the first and second check words, and inverters 12, 13, 14, and 15 are provided for inverting the second check word series. The interleaver 11 serves to prevent errors occurring over the boundary between the blocks from affecting so many words that it is impossible to correct them. The inverters 12, 13, 14, and 15 serve to prevent misoperation when all the data in one block are made "0" by the occurrence of drop-out during transmission. That is to say, if drop out does occur, the inverted check word series will be discriminated correctly in the reproducing system.

The finally-derived twenty-four PCM data sequences and eight check word series are serialized as thirty-two-word blocks and a synchronizing signal of sixteen bits is added to the resulting serial data signal at the head thereof to form one transmission block as shown in FIG. 2. The block thus made is transmitted on a transmission medium or carrier. In FIG. 2, the word provided from the ith transmission channel is depicted as $U_i$.

Practical examples of the transmission medium, or carrier, for the transmitted signal can include magnetic tape for use in magnetic recording and reproducing apparatus, a disc for use in a rotary disc apparatus, or other similar medium.

Figure 3A:
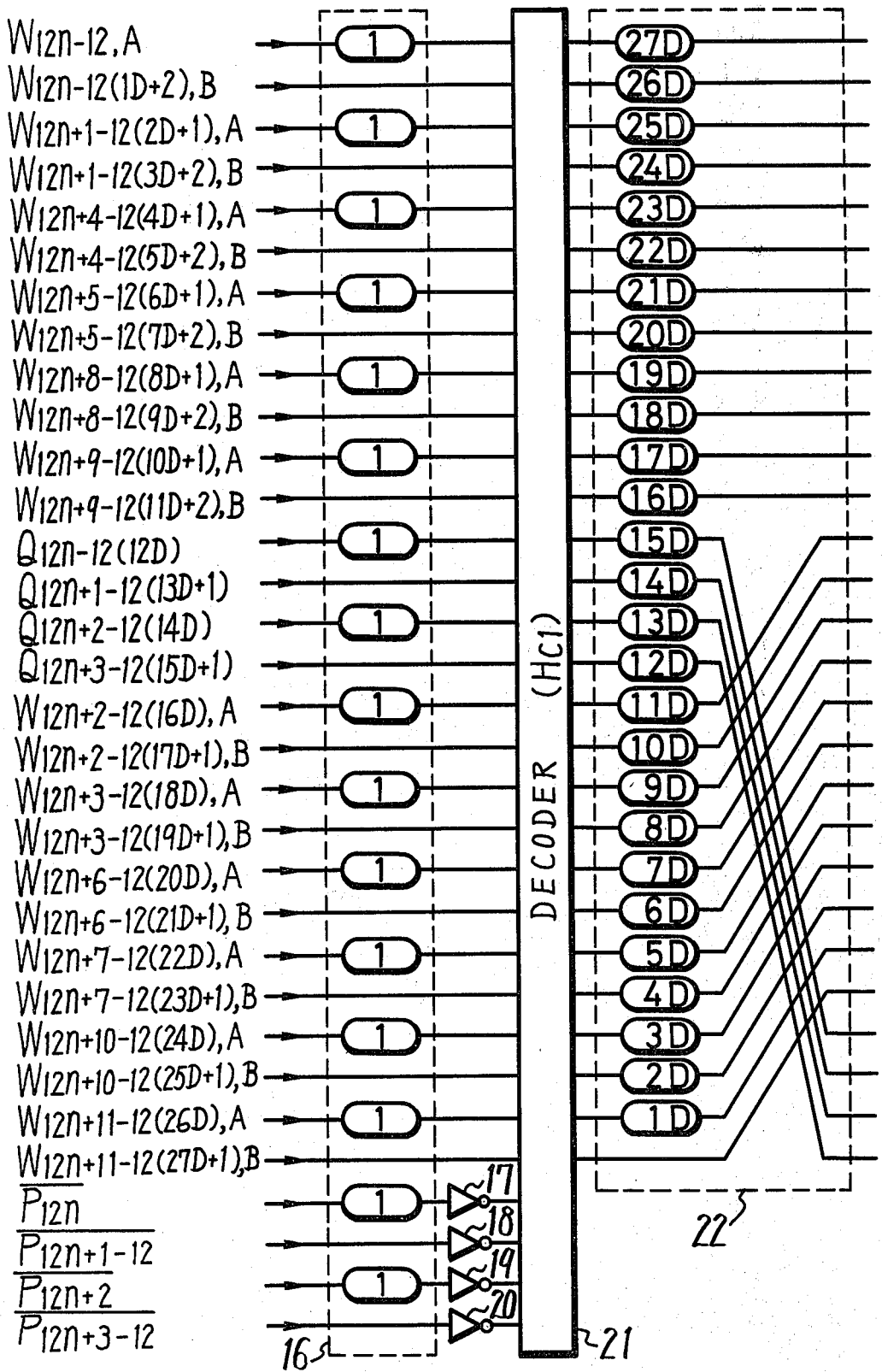
FIG. 3 (formed of FIGS. 3A and 3B) is a block diagram showing an example of an error correcting decoder embodying the present invention.
Figure 3B:
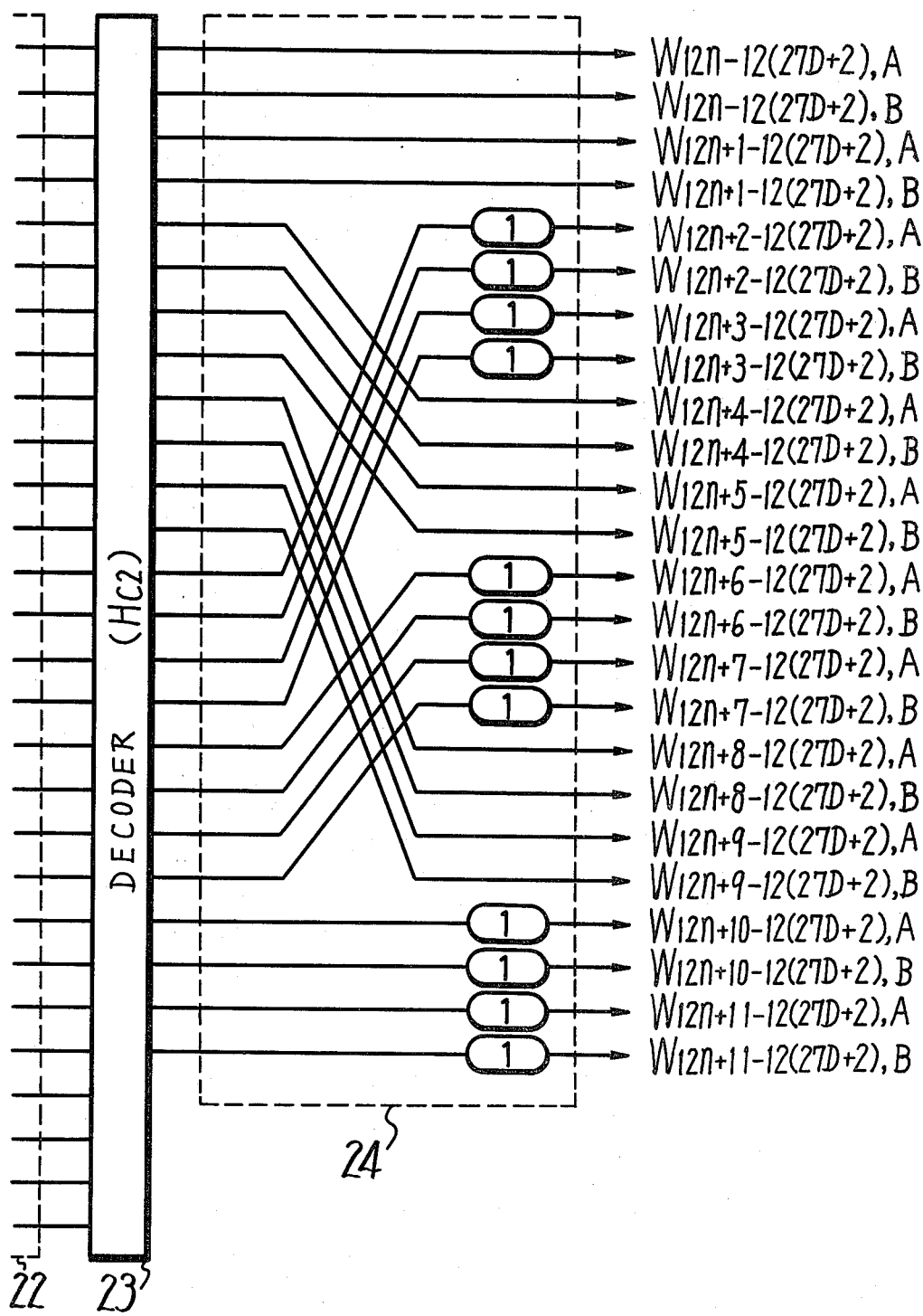

The reproduced data at every thirty-two words of each block of the transmitted signal are applied to the input of an error correcting decoder shown in FIG. 3. The transmitted data as received at the error correcting decoder may contain one or more errors. If there is no error, the thirty-two words fed to the input of the decoder coincide with the thirty-two words appearing at the output of the error correcting encoder. At the error correcting decoder, a de-interleave process complementary to the corresponding interleave process at the encoder is performed to return the data to its original order. If there is an error, the error correcting process is carried out after the data are restored to the original order.

Initially, as shown in FIG. 3, a de-interleaver 16 is provided in which delay lines, each having a delay amount of one word, are provided for the odd order transmission channels, and inverters 17, 18, 19, and 20 are provided for inverting the received second check word series. The outputs from the de-interleaver 16 and the inverters 17 to 20 are coupled to a first decoder 21. In this first decoder 21, syndromes $S_{11}$, $S_{12}$, $S_{13}$, and $S_{14}$ are generated according to a matrix, such as the Reed-Solomon parity detection matrix $H_{CI}$ (FIG. 4) by the thirty-two input words $V^T$ as shown in FIG. 4, and the above-mentioned error correction is performed based upon the syndromes $S_{11}$ to $S_{14}$. In FIG. 4, is an element of GF ($2^8$) and a root of $F(x)+x^8+x^4+x^3+x^2+1$. The decoder 21 derives the corrected twenty-four PCM data sequences and four first check word series. At every individual word of the data sequences, a pointer, or error detecting code, (at least one bit) is added to indicate whether or not there is an error in the associated word.

The output data sequences from the decoder 21 are applied to a de-interleaver 22 which serves to compensate for the delay process performed by the interleaver 9 in the error correcting encoder, and has corresponding delay lines with respective different delay amounts of 27D, 26D, 25D, . . . 2D, and 1D provided for the first to twenty-seventh transmission channels. The output from the de-interleaver 22 is applied to a second decoder 23 in which syndromes $S_{21}$, $S_{22}$, $S_{23}$, and $S_{24}$ are generated according to a matrix, such as the Reed-Solomon parity detection matrix $H_{c2}$ (FIG. 5). The twenty-eight words $V_T$ as shown in FIG. 5 are applied thereto and the above-mentioned error correction is carried out based upon the syndromes $S_{21}$ to $S_{24}$.

The decoder 23 clears the pointer relating to each word whose error is corrected, but does not clear the pointer relating to any word whose error cannot be corrected.

The data sequences appearing at the output of the decoder 23 are applied to an even-and-odd de-interleaver 24, in which the PCM data sequences consisting of the even-order words and the PCM data sequences consisting of the odd-order words are re-arranged so that they are positioned at alternative transmission channels, and delay lines of one word delay amount are provided for the PCM data sequences consisting of the odd-order words. This compensates for the corresponding operation performed in the encoder 1 prior to transmission. At the output of the even-and-odd de-interleaver 24, there are provided the PCM data sequences which have the original arrangement state and predetermined order restored entirely to that of the digital signal before it was acted upon by the error correcting encoder.

Although not shown in FIG. 3, a compensating circuit is preferably provided at the next stage following the even-and-odd de-interleaver 24 to compensate for uncorrectable errors. For example, a mean value interpolation can be used whenever errors are not corrected by the decoders 21 and 23, so that any remaining errors are masked and made inconspicuous.

In the error correcting decoder shown in FIG. 3, error correction using the first check words $P_{12}$, $P_{12n+1}$, $P_{12n+2}$, and $P_{12n+3}$ and error correction using the second check words $Q_{12n}$, $Q_{12n+1}$, $Q_{12n+2}$, $Q_{12n+3}$ are carried out one time. However, if the above error corrections are respectively carried out two times or more, the error correcting ability can be increased considerably, since the corrected result is each time less in error. In practice, it is preferred to carry out the above correction approximately two times.

In the above example, in the delay process in the interleaver 9, the delay amount differs from one channel to the next by a constant amount of variation D, but it is also possible to employ an irregular variation in delay amount rather than the above constant variation. Further, just as the second check words $P_{12n}$ to $P_{12n+3}$ which are formed not only from the PCM data words but also the first check words $Q_{12n}$ to $Q_{12n+3}$, the first check words can be formed from words including the second check words $P_{12n}$ to $P_{12n+3}$. To this end, a feedback technique can be employed so that the second check words are fed back to the encoder 8 which produce the first check words.

As will be understood from the above description of an example of the present invention, an error correcting code is employed to correct, for example, up to two word errors without using a pointer code to indicate the error position, and any burst error is dispersed by the cross-interleave operation, so that both random errors and burst errors can be effectively corrected by the technique of this invention.

According to the error correcting code of the invention, as the number of correctable error words is increased, the decoding algorithm thereof becomes complicated. However, if only a single word error in a block is to be corrected, an extremely simple construction of the decoder is sufficient. Accordingly, error correcting decoders from relatively low error correcting ability to relatively high error correcting ability can be constructed to decode the signals transmitted from a single version of the encoding apparatus. Consequently, various grades of apparatus can be constructed which will all reproduce signals from the same medium. In other words, various grades of disc reproducing apparatus can all be made compatible with discs manufactured according to a process for achieving the highest grade of error correcting ability.

Figure 6A:
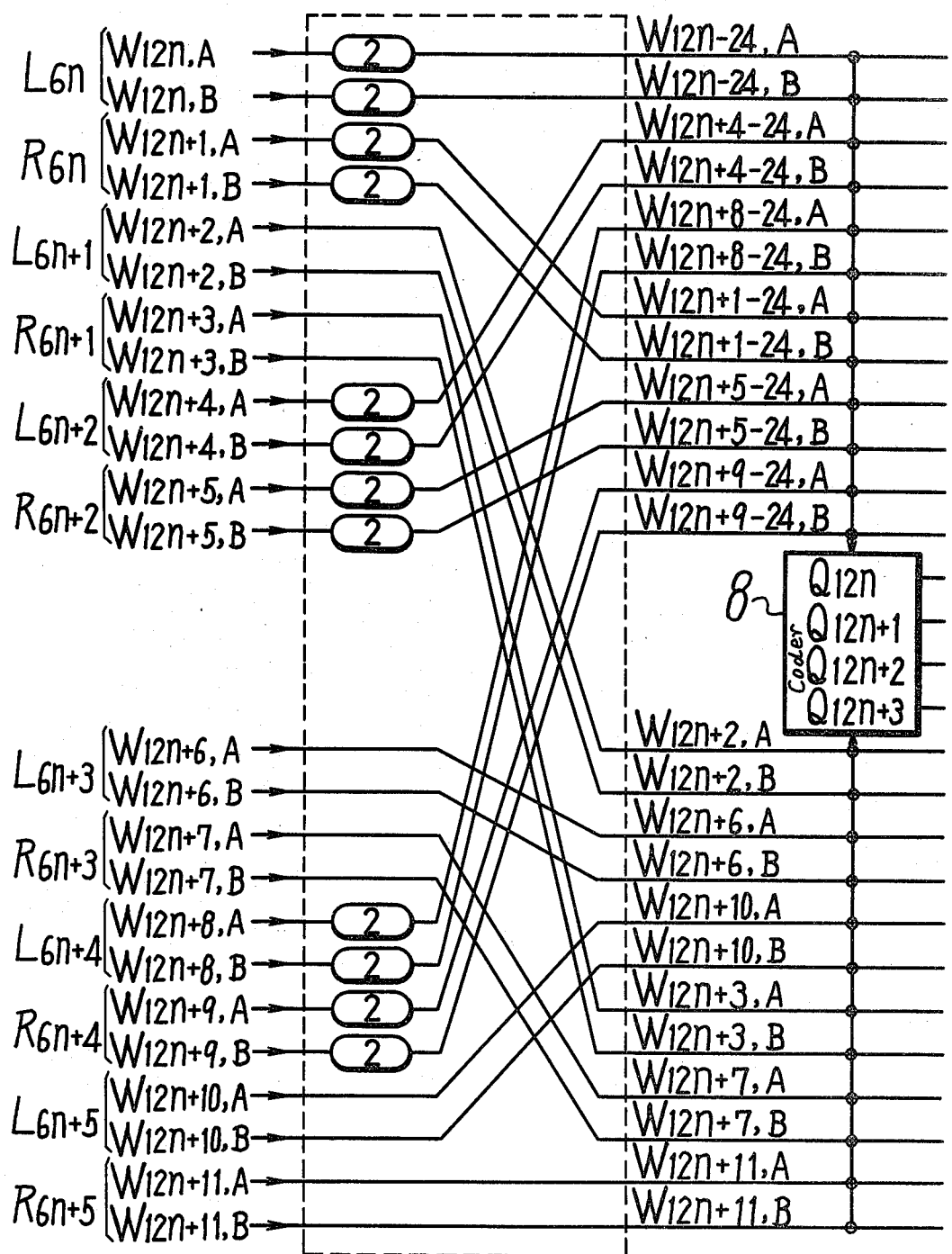
FIG. 6 (formed of FIGS. 6A and 6B) and FIG. 7 (formed of FIGS. 7A and 7B) show an alternative embodiment of an error correcting encoder and decoder, respectively.
Figure 6B:
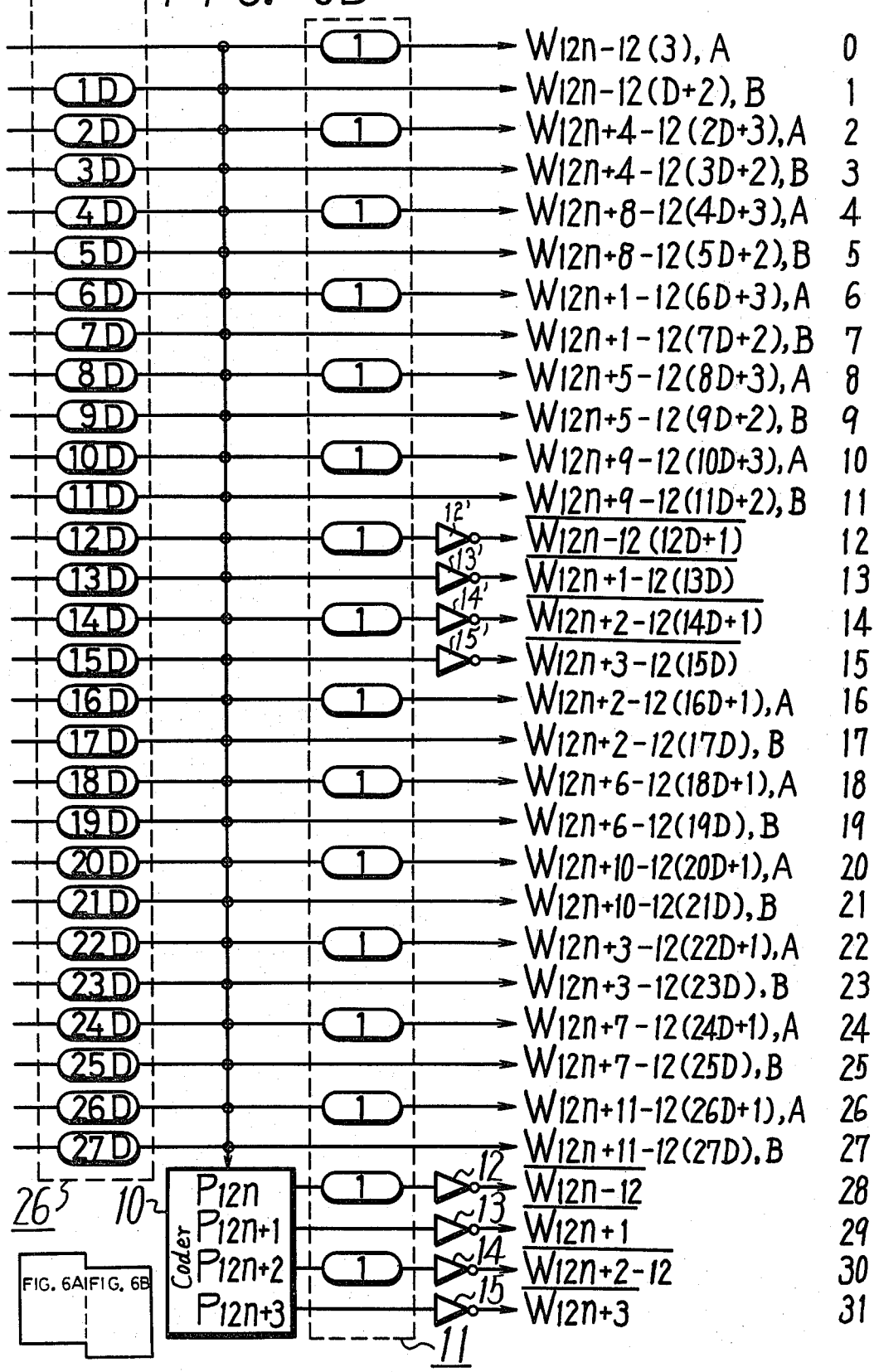
Figure 7A:
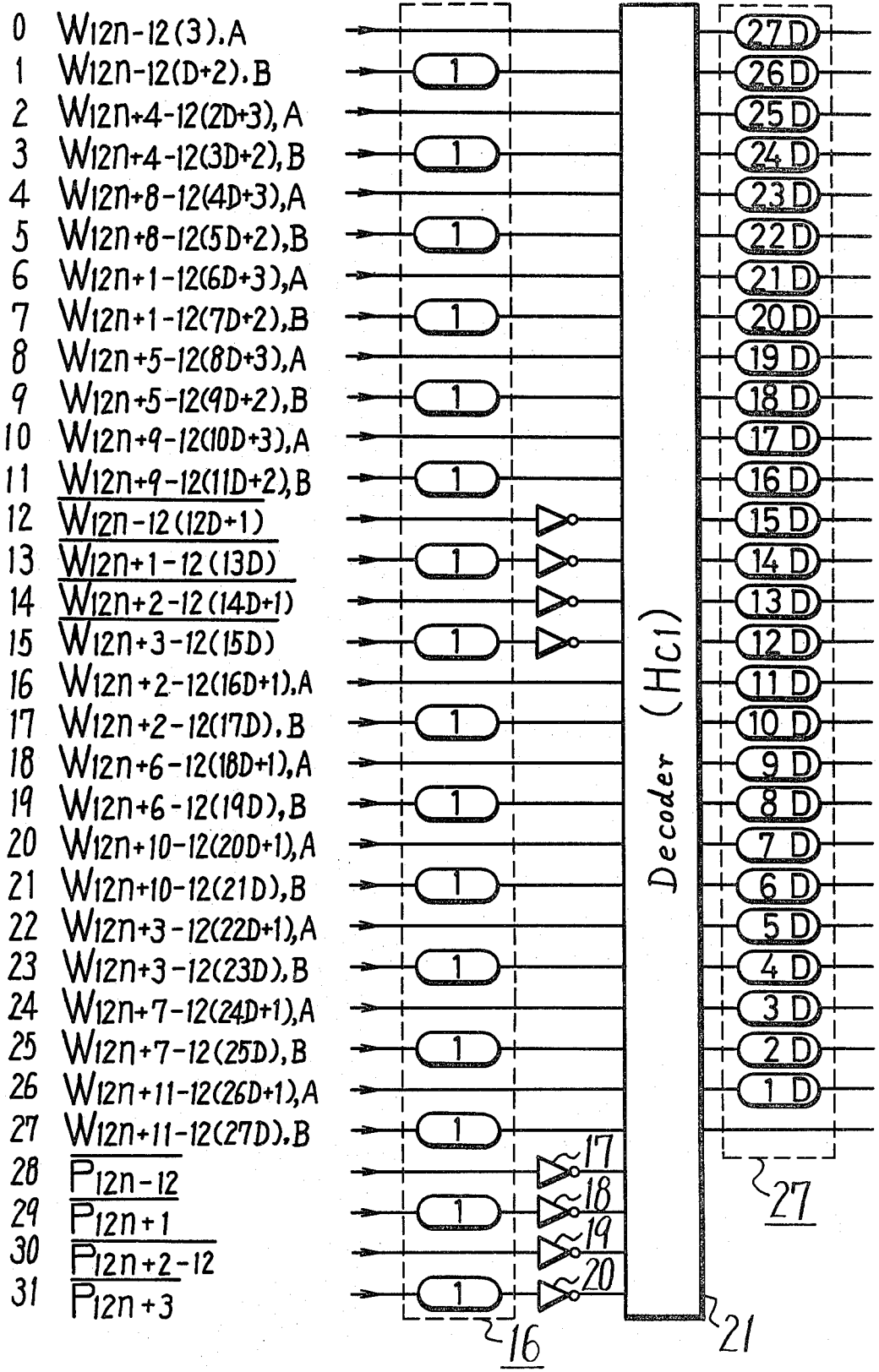

FIGS. 6 and 7 illustrate, in block form, a second encoder and a second decoder, respectively, embodying the principles of this invention. In FIGS. 6 and 7 those elements in common with the embodiment of FIGS. 1 and 3 are identified with the same reference characters, and a detailed description thereof is omitted.

In the encoder of FIG. 6, an interleaver 25 replaces the interleaver 1. This interleaver 25 imparts delays equal to two word intervals, as is indicated by the legends "2" inscribed therein. Also in this embodiment, the cyclic transposition of the coding channels is different from that of the encoder of FIG. 1. More particularly, whereas in the interleaver 1 of FIG. 1, groups of four channels are arranged together, in the interleaver 25 of this embodiment, pairs of channels are arranged together. The input of the interleaver 25 has a new cycle of channels beginning after each eight channels, so that with twenty-four total channels $W_{12n,A}$, $W_{12n,B}$ . . . $W_{12n+11,A}$, $W_{12n+11,B}$ present, there are three cycles of channels. At the output of the interleaver 25, six channels constitute one cycle, so that there are four cycles of six channels.

In FIG. 6, the encoder 8 is disposed between the two groups of code channels $W_{12n-2,A}$ to $W_{12n+9-24,B}$ and $W_{12n+2,A}$ to $W_{12n+11,B}$ so that the number of crossovers can be minimized. As a result, an interleaver 26, which replaces the interleaver 9 of FIG. 1, can be constituted of delay elements only. In this embodiment the unit of delay D can favorably be equal to six word lengths.

It should be noted that in this embodiment, the interleaver 11 introduces delays to the odd channels, whereas, the corresponding interleaver 11 of FIG. 1 introduces delays to the even channels.

Finally, inverters 12′, 13′, 14′ and 15′ are included to invert the check words $Q_{12n}$ to $Q_{12n+3}$.

The circuitry of the decoder of FIG. 7 is complementary to that of the encoder of FIG. 6, and need not be discussed in detail, except to say that the arrangements of deinterleavers 27 and 28 thereof correspond to the arrangement of the interleavers 26 and 25, respectively.

The arrangement of FIGS. 6 and 7 is most suitable for processing two audio signals (i.e., stereophonic signals).

Figure 8:
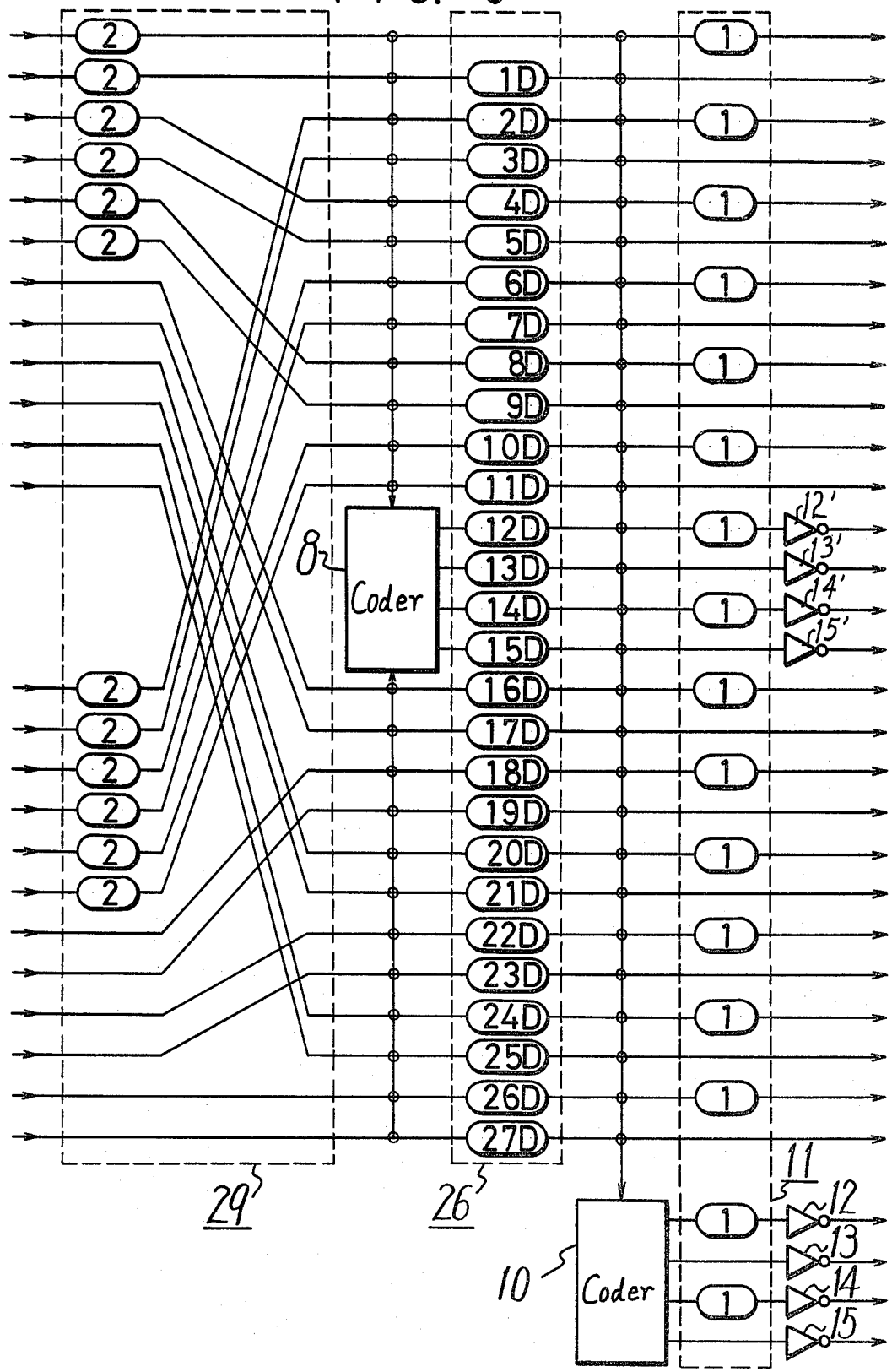
FIGS. 8 and 9 show portions of another alternative embodiment of an error correcting encoder and decoder, respectively.
Figure 9:
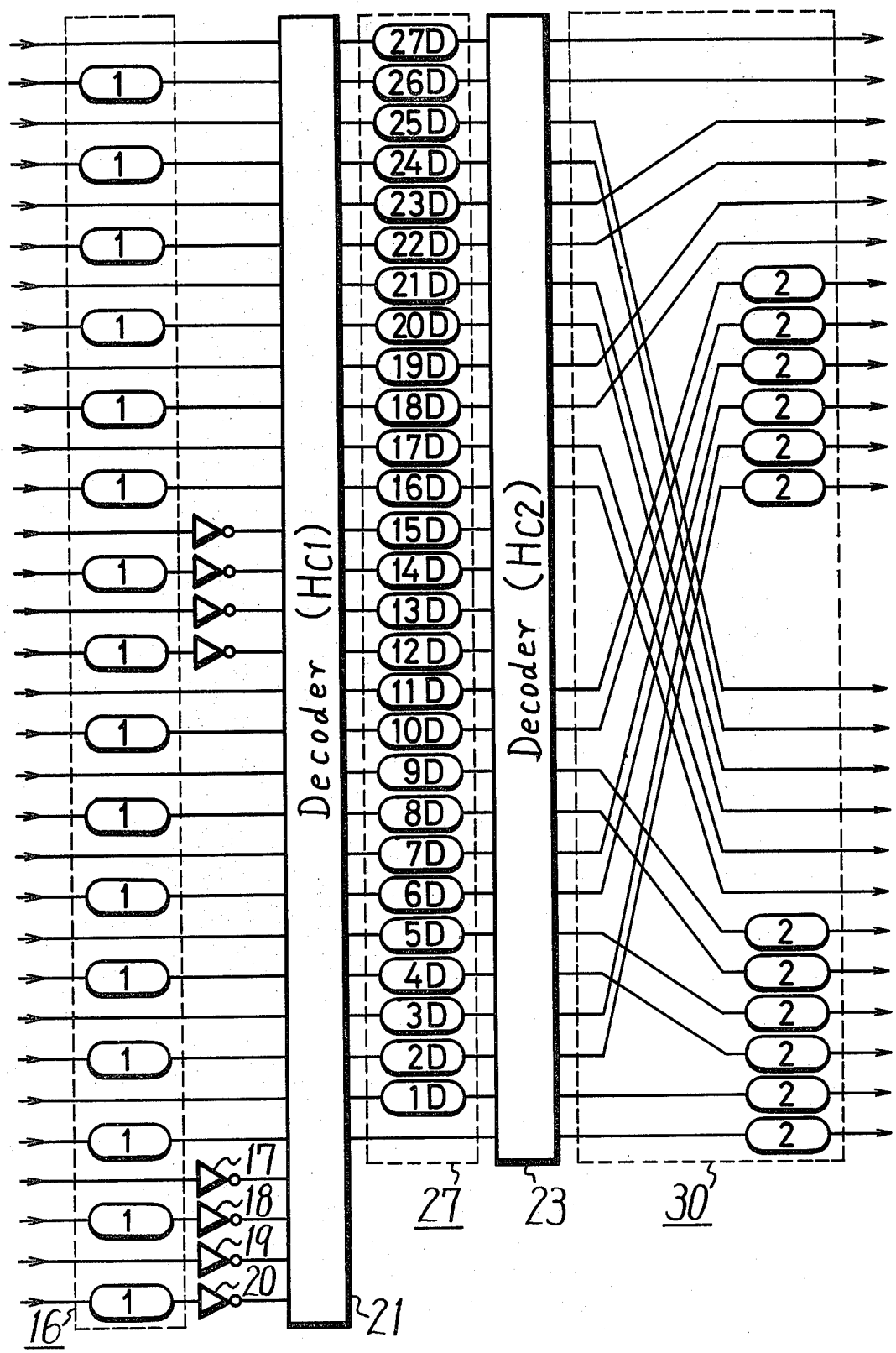

FIGS. 8 and 9 illustrate, in block diagram, a third encoder and a third decoder, respectively, embodying the present invention. Elements thereof in common with previously described embodiments are identified with the same reference characters, and a detailed description thereof is omitted. FIG. 8 is generally the same as FIG. 6, with the exception of the arrangement of an interleaver 29 thereof, which replaces the interleaver 25. Here, the first six channels and the third six channels are each delayed by two word intervals, with the second and fourth six channels being undelayed. The transposition of the coding channels is also carried out differently. That is, at the input of the interleaver 29, each pair of channels is arranged together, so that a new cycle starts after each twelve channels. The output thereof is connected so that a new cycle starts after each four channels, so that there are six cycles of four channels present.

The decoder arrangement of FIG. 9 (particularly deinterleaver 30 thereof) is directly complementary to the encoder arrangement of FIG. 8.

The arrangement of FIGS. 8 and 9 is particularly suitable for use with three-channel audio signals.

FIGS. 10 and 11 illustrate, in block diagram, a fourth encoder and a fourth decoder, respectively, embodying this invention. Elements thereof in common with previously described embodiments are identified with the same reference characters and a detailed description thereof is omitted.

FIGS. 10 and 11 are generally the same as FIGS. 9 and 10, except for the arrangement of an interleaver 31 in the encoder of FIG. 10 and of a deinterleaver 32 in the decoder of FIG. 11. In the interleaver 31, the coding channels are distributed over three groups, with the first eight channels not being delayed, the second eight channels being provided with respective delays of one word interval, and the third eight channels being provided with respective delays of two word intervals. No rearrangement of the channels is carried out.

The deinterleaver 32 of FIG. 11 is complementary to the interleaver 31.

The encoder and decoder of FIGS. 10 and 11 are particularly suitable for use with audio signals of four channels, such as quadrophonic sound signals.

It should be pointed out that changing the encoder and decoder between those of the arrangement of FIGS. 6 and 7 and those of the arrangements of FIGS. 8 and 9 and of FIGS. 10 and 11 requires only substitution of the appropriate interleaver 25, 29, or 31 and the corresponding deinterleaver 28, 30, or 32. In this way, the same basic circuitry can be used for two, three, or four channel audio signals.

Each of these embodiments facilitates interpolation to replace uncorrectable erroneous signals.

Although general illustrative embodiments of the present invention have been described in detail hereinabove with reference to the accompanying drawings, it is to be understood that the invention is not limited to those embodiments, and that many modifications and variations can be effected therein by those skilled in the art without departing from the scope and spirit of the invention as defined in the appended claims.

We claim:

1. A method of transmitting a digital information signal formed of a plurality of sequences of information words, each word being of a predetermined bit length with each such sequence of words occurring in a respective input channel, and with check words included in the transmitted signal to enable correction of errors occurring in the signal as a result of transmission, comprising the steps of applying a first block of words, taken one from each such input channel, and having a first arrangement state, to a first error-correcting encoder to generate a series of k first check words;

delaying each of the words in said first block and each of the k first check words by a respective different delay time to provide a resulting second block of words in a second arrangement state;

applying said second block of words to a second error-correcting encoder to generate a series of k second check words; and transmitting said second block of words together with said second check words; wherein said first and second check words are generated to satisfy a parity check matrix having n columns and k rows, and in which each element of one predetermined row is selected from digital values from zero to $2^m - 1$, so that the same value does not appear twice in said predetermined row, and wherein the elements in the remaining rows are selected to be a given power, for all the elements in each respective row, of the corresponding elements in said predetermined row, where m is the bit length of said data words and n is the number of words in each block formed of the digital words of the information signal together with the associated check words.

2. A method of transmitting a digital information signal according to claim 1, wherein said parity check matrix is a Reed-Solomon code parity check matrix H, selected from the group consisting of $$H = \begin{bmatrix} 1 & 1 & 1 & \ldots 1 & 1 \\ \alpha^1 & \alpha^2 & \alpha^3 & \ldots \alpha^{n-1} & \alpha^n \\ \alpha^2 & \alpha^4 & \alpha^6 & \ldots \alpha^{2(n-1)} & \alpha^{2n} \\ \cdot & \cdot & \cdot & \cdot & \cdot \\ \cdot & \cdot & \cdot & \cdot & \cdot \\ \cdot & \cdot & \cdot & \cdot & \cdot \\ \alpha^{k-1} & \alpha^{(k-1)2} & \alpha^{(k-1)3} & \alpha^{(k-1)(n-1)} & \alpha^{(k-1)m} \end{bmatrix}$$

and $$H = \begin{bmatrix} 1 & 1 & 1 & \ldots 1 & 1 \\ 1 & \alpha^1 & \alpha^2 & \ldots \alpha^{n-2} & \alpha^{n-1} \\ 1 & \alpha^2 & \alpha^4 & \ldots \alpha^{2(n-2)} & \alpha^{2(n-1)} \\ \cdot & \cdot & \cdot & \cdot & \cdot \\ \cdot & \cdot & \cdot & \cdot & \cdot \\ \cdot & \cdot & \cdot & \cdot & \cdot \\ 1 & \alpha^{k-1} & \alpha^{(k-1)2} & \ldots \alpha^{(k-1)(n-2)} & \alpha^{(k-1)(n-1)} \end{bmatrix}$$

where $\alpha$ is a root of a polynomial F(X) which is irreducible over a galois field GF(2).

3. A method of transmitting a digital information signal according to claim 1, wherein said step of applying the first block of words includes delaying the words of at least certain ones of the input channels by an amount different from any delay imparted to the words of the remaining input channels prior to the application thereof to said first error correcting encoder.

4. A method of transmitting a digital information signal according to claim 3, wherein respective groups of said input channels provide words representing values taken at intervals in time sequence, with the groups representing alternate intervals being delayed by said amount different from the remaining groups, so that said groups are time-interleaved.

5. A method of transmitting a digital information signal according to claim 3, wherein said plurality of sequences of words occur in a plurality of cycles each of a plurality of adjacent input channels, so that the plurality of such cycles together constitute said plurality of channels; and said step of analyzing the first block of words to said first error-correcting encoder includes cyclically distributing the sequences of words such that three cycles are transposed to form four cycles.

6. A method of transmitting a digital information signal according to claim 3, wherein said plurality of sequences of words occurs in a plurality of cycles each of a plurality of adjacent input channels, so that the plurality of such cycles together constitute said plurality of channels; and said step of applying the first block of words to said first error-correcting encoder includes cyclically distributing the sequences of words such that two cycles are transposed to form six cycles.

7. A method of transmitting a digital information signal according to claim 3, wherein said plurality of sequences of words occurs in three cycles each of a plurality of adjacent input channels, so that the plurality of such cycles together contribute said plurality of channels; and said step of applying the first block of words to said first error-correcting encoder includes delaying all the words of each cycle of input channels by an amount different from that applied to the remaining cycles.

8. A method of transmitting a digital information signal according to claim 1, wherein said step of transmitting said second block of words together with said second series of check words includes delaying at least certain ones of the words of said second block of words an amount different from any delay imparted to the remaining words.

9. A method of transmitting a digital information signal according to claim 8, wherein alternate ones of said input channels provide words representing the more significant bits of respective digitized values and the remaining bits of such values, and the substep of delaying included in said transmitting includes delaying those words representing one of said more significant bits and said less significant bits by said amount.

10. A method of transmitting a digital information signal according to claim 1, wherein said step of transmitting includes inverting said series of second check words.

11. A method of reproducing transmitted information that is received as blocks of digital data words of a predetermined bit length, and which includes a first series of k check words and a second series of k check words, comprising the steps of
decoding the received digital data words and the first and second series of check words and correcting the decoded digital data words and the series of first check words by said series of second check words;
delaying said corrected digital data words and said series of first check words by respective different amounts so as to arrange the same into a different arrangement order; and
decoding the digital data words and the series of first check words so arranged, and correcting the digital data words by said series of first check words; wherein each such decoding is achieved by generating syndromes according to a parity check matrix having n columns and k rows, and in which each element of one predetermined row is selected from digital values from zero to $2^m-1$, so that the same value does not appear twice in said predetermined row, and in which the elements in the remaining rows are selected to be a given power, for all the elements in each respective row, of the corresponding elements in said predetermined row, where m is the bit length of said data words and n is the number of words in each block formed of the digital data words and the associated check words.

12. A method of reproducing transmitted information according to claim 11, wherein said parity check matrix is a Reed-Solomon parity check matrix H, selected from the group consisting of $$H = \begin{bmatrix} 1 & 1 & 1 & \ldots 1 & 1 \\ \alpha^1 & \alpha^2 & \alpha^3 & \ldots \alpha^{n-1} & \alpha^n \\ \alpha^2 & \alpha^4 & \alpha^6 & \ldots \alpha^{2(n-1)} & \alpha^{2n} \\ \vdots & \vdots & \vdots & \vdots & \vdots \\ \alpha^{k-1} & \alpha^{(k-1)2} & \alpha^{(k-1)3} & \ldots \alpha^{(k-1)(n-1)} & \alpha^{(k-1)n} \end{bmatrix}$$

and $$H = \begin{bmatrix} 1 & 1 & 1 & \ldots 1 & 1 \\ 1 & \alpha^1 & \alpha^2 & \ldots \alpha^{n-2} & \alpha^{n-1} \\ 1 & \alpha^2 & 4 & \ldots \alpha^{2(n-2)} & \alpha^{2(n-1)} \\ \vdots & \vdots & \vdots & \vdots & \vdots \\ 1 & \alpha^{k-1} & \alpha^{(k-1)2} & \ldots \alpha^{(k-1)(n-2)} & \alpha^{(k-1)(n-1)} \end{bmatrix}$$

where $\alpha$ is a root of polynominal F(x) which is irreducible over a galois field GF(2).

13. A method of reproducing transmitted information according to claim 11, wherein prior to the first-mentioned step of decoding, said method includes inverting said second check words.

14. A method of reproducing transmitted information according to claim 11, wherein prior to the first-mentioned step of decoding, said method includes delaying at least certain ones of the words of said blocks of received digital data by an amount different from any delay imparted to the remaining words, thereby compensating for a corresponding delay imparted prior to transmission.

15. A method of reproducing transmitted information according to claim 14, wherein alternate information words of each said block represent the more significant bits of respective digitized values and the remaining information words represent the less significant bits of such values, respectively, and the step of delaying prior to the first-mentioned step of decoding includes delaying those words representing one of said more significant bits and said less significant bits by said amount.

16. A method of reproducing transmitted information according to claim 11, further comprising, following the second-mentioned step of correcting, the step of delaying at least certain ones of the corrected digital data words by an amount different from any delay imparted to the remaining words, thereby compensating for a corresponding delay imparted to the words of the digital data prior to transmission.

17. A method of reproducing transmitted information according to claim 16, wherein respective groups of the corrected digital data words represent values taken at intervals in time sequence, with the groups of words being delayed so as to compensate for said corresponding delay imparted prior to transmission and thereby to restore the groups of data words to their original time sequence prior to encoding for error correction.

18. A method of reproducing transmitted information according to claim 16, wherein during the last-mentioned step of delaying the words of said blocks of digital data words occur as a plurality of cycles, each having a plurality of successive digital data words, so that the plurality of such cycles together constitute a block of decoded digital data words, and such step of delaying includes cyclically distributing the digital data words such that four such cycles are transposed to form three cycles.

19. A method of reproducing transmitted information according to claim 16, wherein during the last-mentioned step of delaying the words of said blocks of digital data words occur as a plurality of cycles, each having a plurality of successive digital data words so that the plurality of such cycles together constitute a block of decoded digital data words; and such step of delaying includes cyclically distributing the digital data words such that six such cycles are transposed to form two cycles.

20. A method of reproducing transmitted information according to claim 16, wherein during the last-mentioned step of delaying the words of said blocks of digital data words occur as three cycles, each having a plurality of successive digital data words so that the three cycles together constitute a block of decoded digital data words; and such step of delaying includes delaying all the words of each cycle by an amount different from that applied to the remaining cycles.

21. Data encoding apparatus for encoding a digital data signal to be transmitted to permit correction of errors occurring in the signal during transmission, the data being formed as a plurality of sequences of words of a predetermined bit length m, each such series occurring in a respective input channel, so that the transmitted signal includes check words to enable said correction of errors, comprising input means to which said digital data signal is applied for providing a first block of words, one from each sequence of words, and having a first arrangement state;

first encoder means coupled to said input means for generating a series of k first check words;

interleaving means coupled to said input means and said first encoder means for delaying each of the words in said first block and each of said first check words by a respective different delay time to provide a resulting second block of words having a second arrangement state;

second encoder means coupled to said interleaving means for generating a series of k second check words; and output means coupled to said second encoder means and said interleaving means for providing for transmission of the encoded digital data signal as a third block formed of said digital words, said first check words, and said second check words; wherein each of said first and second encoder means generates said first and second check words, respectively, to satisfy a parity check matrix having n columns and k rows, and in which each element of one predetermined row is selected from digital values from zero to $2^m - 1$, so that the same value does not appear twice in said predetermined row, and wherein the elements in the remaining rows are selected to be a given power, for all the elements in each respective row, of the corresponding elements in said predetermined row, where m is the bit length of said data words and n is the number of words in each block formed of the words of the digital data signal together with the associated check words.

22. Data encoding apparatus according to claim 21, wherein said parity check matrix is a Reed-Solomon code parity check matrix H, selected from the group consisting of $$H = \begin{bmatrix} 1 & 1 & 1 & \ldots 1 & 1 \\ \alpha^1 & \alpha^2 & \alpha^3 & \ldots \alpha^{n-1} & \alpha^n \\ \alpha^2 & \alpha^4 & \alpha^6 & \ldots \alpha^{2(n-1)} & \alpha^{2n} \\ . & . & . & . & . \\ . & . & . & . & . \\ . & . & . & . & . \\ \alpha^{k-1} & \alpha^{(k-1)2} & \alpha^{(k-1)3} & \ldots \alpha^{(k-1)(n-1)} & \alpha^{(k-1)n} \end{bmatrix}$$

and $$H = \begin{bmatrix} 1 & 1 & 1 & \ldots 1 & 1 \\ 1 & \alpha^1 & \alpha^2 & \alpha^{n-2} & \alpha^{n-1} \\ 1 & \alpha^2 & \alpha^4 & \alpha^{2(n-2)} & \alpha^{2(n-1)} \\ . & . & . & . & . \\ . & . & . & . & . \\ . & . & . & . & . \\ 1 & \alpha^{k-1} & \alpha^{(k-1)2} & \alpha^{(k-1)(n-2)} & \alpha^{(k-1)(n-1)} \end{bmatrix}$$

where $\alpha$ is a root of a polynomial $F(X)$ which is irreducible over a galois field $GF(2)$.

23. Data encoding apparatus according to claim 21, wherein said input means includes interleaving means for changing the arrangement state of said digital words prior to application to said first encoder means and the first-mentioned interleaving means.

24. Data encoding apparatus according to claim 23, wherein said interleaving means has a plurality of inputs each associated with a respective one of said word sequences and a like plurality of outputs, said inputs being arranged as three cycles of successive such sequences, the three cycles together constituting said plurality of sequences, said outputs being arranged as four cycles of successive sequences of words, the four cycles together constituting said plurality of sequences; and means cyclically distributing the sequences of words such that said three cycles are transposed into said four cycles.

25. Data encoding apparatus according to claim 23, wherein said interleaving means has a plurality of inputs each associated with a respective one of said word sequences and a like plurality of outputs, said inputs being arranged as two cycles of successive such sequences, the two cycles together constituting said plurality of sequences, said outputs being arranged as six cycles of successive such cycles of words, the six cycles together constituting said plurality of sequences; and means cyclically distributing the sequences of words such that said two cycles are transposed into said six cycles.

26. Data encoding apparatus according to claim 21, wherein said input means further includes delay means for delaying at least certain groups of the digital words by an amount different from any delay imparted to the remaining digital words.

27. Data encoding apparatus according to claim 26, wherein said input means is arranged as three groups of successive digital words, and said delay means imparts an amount delay to all the words of each of two of said groups so that each such group of words is delayed by an amount different from that imparted to the remaining groups.

28. Data encoding apparatus according to claim 21, wherein said output means includes delay means for delaying alternate ones of said words of said third block, so that adjacent words of said third block occur in different blocks in the transmitted signal.

29. Data encoding apparatus according to claim 21, wherein said output means includes inverter means for inverting at least one of said series of said first check words and said second check words.

30. Data decoding apparatus for decoding a digital information signal and correcting errors occurring therein during transmission by application of a series of first check words and a series of second check words, the transmitted digital signal being received as a block of digital data words of a predetermined bit length m, and which includes said series of first check words and said series of second check words, each such series having k check words, comprising input means for receiving said transmitted digital signal as a first block formed of the words of the information signal and said series of first and second check words;

first decoder means coupled to said input means for decoding the received digital data words and the first and second check words and correcting the digital data words and the series of first check words by said series of second check words;

deinterleaving means for delaying each of the words of the digital data signal and of the first series of check words by a respective different amount and arranging such words in a different arranging order, thereby providing a second block formed of the words of the information signal and the first check words;

second decoder means coupled to said deinterleaving means for decoding the words of the digital data signal and the first series of check words so arranged and for correcting the digital data words by said first series of check words to provide a third block of said data words; and output means coupled to said second decoder means to receive said third block for providing the corrected digital signal; wherein each of said first and second decoder means decodes by generating syndromes according to a parity check matrix having n columns and k rows, and in which each element of one predetermined row is selected from digital values from zero to $2^m - 1$, so that the same value does not appear twice in said predetermined row, and in which the elements in the remaining rows are selected to be of a given power, for all the elements in each respective row, where m is the bit length of said data words and n is the number of words in each block formed of the digital data words and the associated check words.

31. Data decoding apparatus according to claim 30, wherein said parity check matrix is a Reed-Solomon parity check matrix H, selected from the group consisting of $$H = \begin{bmatrix} 1 & 1 & 1 & \ldots 1 & 1 \\ \alpha^1 & \alpha^2 & \alpha^3 & \alpha^{n-1} & \alpha^n \\ \alpha^2 & \alpha^4 & \alpha^6 & \alpha^{2(n-1)} & \alpha^{2n} \\ \vdots & \vdots & \vdots & \vdots & \vdots \\ \alpha^{k-1} & \alpha^{(k-1)2} & \alpha^{(k-1)3} & \ldots \alpha^{(k-1)(n-1)} & \alpha^{(k-1)n} \end{bmatrix}$$

and $$H = \begin{bmatrix} 1 & 1 & 1 & \ldots 1 & 1 \\ 1 & \alpha^1 & \alpha^2 & \alpha^{n-2} & \alpha^{n-1} \\ 1 & \alpha^2 & \alpha^4 & \alpha^{2(n-2)} & \alpha^{2(n-1)} \\ \vdots & \vdots & \vdots & \vdots & \vdots \\ 1 & \alpha^{k-1} & \alpha^{(k-1)2} & \ldots \alpha^{(k-1)(n-2)} & \alpha^{(k-1)(n-1)} \end{bmatrix}$$

where $\alpha$ is a root of a polynomial $F(X)$ which is irreducible over a galois field $GF(2)$.

32. Data decoding apparatus according to claim 30, wherein said input means includes delay means for delaying alternate ones of words of said first block by a delay amount different from any delay imparted to the remaining words.

33. Data decoding apparatus according to claim 30, wherein said input means includes inverter means for inverting at least one of said first and second series of check words.

34. Data decoding apparatus according to claim 30, wherein said output means includes interleaving means for changing the arrangement state of said digital words in said third block.

35. Data decoding apparatus according to claim 34, wherein said interleaving means includes a plurality of inputs each associated with a respective one of said words of said third block; a like plurality of outputs, said inputs being arranged as four cycles of successive such words, the four cycles together constituting said third block, said outputs being arranged as three cycles of successive words, the three cycles together constituting a block of said corrected digital data signal; and means cyclically distributing the third block of words such that said four cycles are transposed into said three cycles.

36. Data decoding apparatus according to claim 34, wherein said interleaving means includes a plurality of inputs each associated with a respective one of said words of said third block, a like plurality of outputs, said inputs being arranged as six cycles of successive such words, the six cycles together constituting said third block, said outputs being arranged as two cycles of successive words, the two cycles together constituting a block of said corrected digital data signal; and means cyclically distributing the third block of words such that said six cycles are transposed into said two cycles.

37. Data decoding apparatus according to claim 30, wherein said output means includes delay means for delaying at least certain groups of the digital words by an amount different from any delay imparted to the remaining digital words.

38. Data decoding apparatus according to claim 37, wherein said output means is arranged as three groups of successive words of said third block, and said delay means imparts an amount of delay to all the words of each of two of said groups so that each such group of words is delayed by an amount different from that imparted to the remaining groups.

39. A carrier storing digital information comprised of blocks of words of digital information each of bit length m, within which there are interleaved a series of k first check words generated from words of the digital information representing sampled values, with the words of the digital information signal being time-interleaved with respect to each other, and a series of k second check words generated from the time interleaved words of the digital information and the first check words interleaved therewith, and said check words being generated to satisfy a parity check matrix having n columns and k rows, in which each element of one predetermined row is selected from digital values from zero to $2^m-1$, so that the same value does not appear twice in said predetermined row, and in which the elements in the remaining rows are selected to be a given power, for all the elements in each respective row, of the corresponding elements in said predetermined row, where n is the number of words collectively formed from the digital information words and the associated check words.

* * * * *